(12) United States Patent
Kato et al.

(10) Patent No.: US 8,674,055 B2
(45) Date of Patent: Mar. 18, 2014

(54) METHOD FOR PRODUCING POLYAMIDE RESIN

(75) Inventors: Koya Kato, Nagoya (JP); Atsushi Masunaga, Nagoya (JP); Hideo Matsuoka, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 238 days.

(21) Appl. No.: 13/201,598

(22) PCT Filed: Feb. 24, 2010

(86) PCT No.: PCT/JP2010/052814
§ 371 (c)(1),
(2), (4) Date: Aug. 15, 2011

(87) PCT Pub. No.: WO2010/098335
PCT Pub. Date: Sep. 2, 2010

(65) Prior Publication Data
US 2011/0301290 A1    Dec. 8, 2011

(30) Foreign Application Priority Data

Feb. 26, 2009    (JP) .................. 2009-043874
Aug. 31, 2009    (JP) .................. 2009-199305

(51) Int. Cl.
*C08G 69/26*    (2006.01)

(52) U.S. Cl.
USPC .................. 528/335; 528/271; 528/332

(58) Field of Classification Search
USPC .................. 528/332, 335, 480, 481, 503
See application file for complete search history.

(56) References Cited

U.S. PATENT DOCUMENTS

| 4,719,284 A | 1/1988 | Nielinger et al. |
| 2002/0019477 A1 | 2/2002 | Bartz et al. |
| 2002/0032305 A1 | 3/2002 | Kuhn et al. |

FOREIGN PATENT DOCUMENTS

| JP | 56-149431 A | 11/1981 |
| JP | 62-32122 A | 2/1987 |
| JP | 2002-69296 A | 3/2002 |
| JP | 2002-540237 A | 11/2002 |
| WO | WO 00/09586 A1 | 2/2000 |

OTHER PUBLICATIONS

Bennett et al., "Synthesis and Characterization of Polyamides Containing Octadecanedioic Acid: Nylon-2,18, Nylon-3,18, Nylon-4,18, Nylon 6-18, Nylon-8,18, Nylon-9,18, and Nylon-12,18", Journal of Polymer Science: Part A: Polymer Chemistry, vol. 43, pp. 936-945, 2005.

Cui et al. "Synthesis and Characterization of Novel Even-Odd Nylons Based on Undecanediodic Acid", European Polymer Journal 40 (2004) pp. 1111-1118.

Cui et al."Synthesis and Characterization of Polyamides X 18", Journal of Applied Polymer Science, vol. 98, pp. 1565-1571, 2005.

Gaymans et al. "Preparation and Some Properties of Nylon 46", Journal of Polymer Science: Polymer Chemistry Edition, vol. 15, pp. 537-545 (1977).

*Primary Examiner* — Frances Tischler
(74) *Attorney, Agent, or Firm* — Birch, Stewart, Kolasch & Birch, LLP

(57) ABSTRACT

A method for producing a polyamide resin characterized by comprising thermally polycondension of tetramethylene diamine and either an aliphatic dicarboxylic acid having 7 or more carbon atoms or a salt thereof, and then being melt-polymerized at a temperature equal to or higher than the melting point thereof until the relative viscosity of a 0.01 g/ml solution thereof in 98% sulfuric acid solution with a 0.01 g/ml content at 25° C. becomes 2.2-5.0.

13 Claims, 1 Drawing Sheet

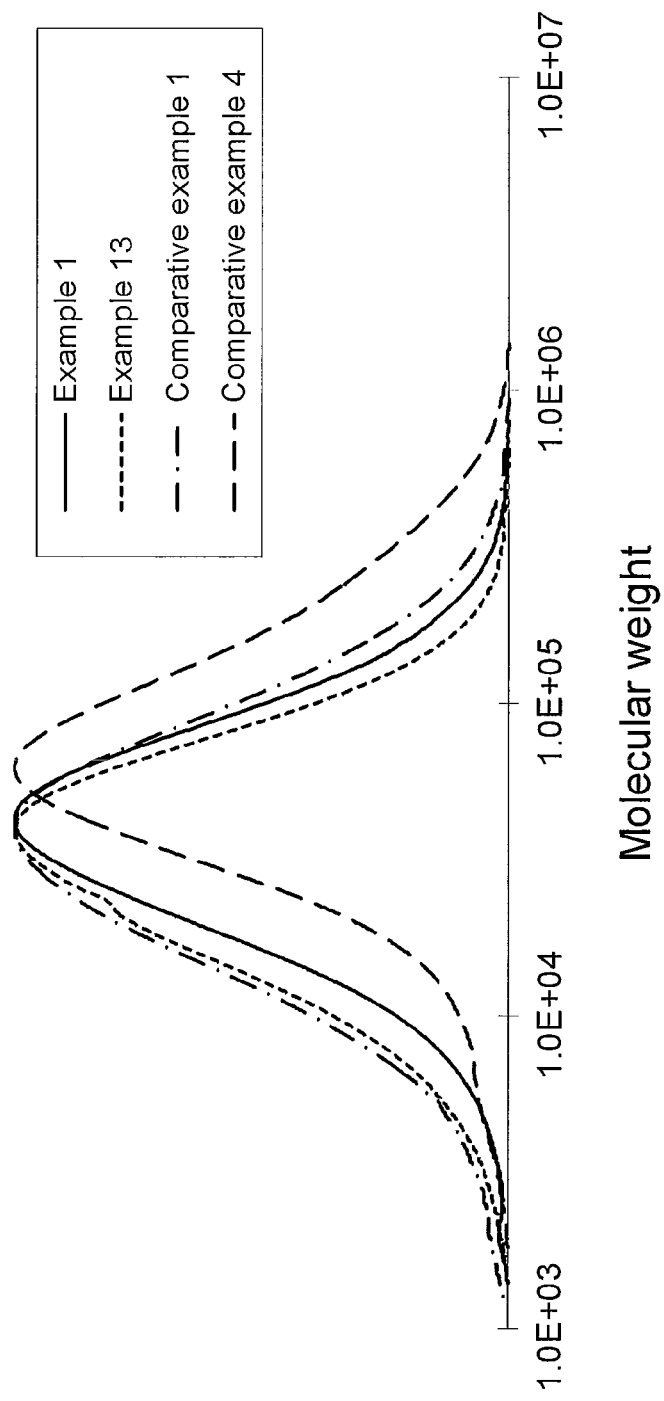

METHOD FOR PRODUCING POLYAMIDE RESIN

TECHNICAL FIELD

The invention relates to a method for producing a polyamide resin comprising tetramethylene diamine as the primary constituent and having high melt retention stability.

BACKGROUND ART

Nylon 46 is a typical polyamide resin comprising tetramethylene diamine as a constituent, but for the melt polymerization method, which is a conventionally known nylon polymerization method in which an aqueous solution of the salt is concentrated under a pressure followed by relieving it to allow the temperature to rise above the melting point, it is difficult to produce nylon 46 with a high degree of polymerization because pyrrolidine resulting from intramolecular cyclization of tetramethylene diamine acts as a terminal blocking agent. Therefore, a special polymerization method is necessary to produce nylon 46 as described in Patent document 1.

Non-patent document 1 has described a method in which the oligomer obtained by heating a nylon 46 salt in a closed system is polymerized in solid or melt state. The melt polymerization method, however, has the problem of liability to an upper limit to the degree of polymerization and coloring of the product, and as described in Patent document 1, solid phase polymerization has been conventionally required to produce a white nylon 46 with a high degree of polymerization. Nylon 46 has another problem of being decomposed easily when melted, leading to a low melt retention stability.

There has been another nylon 46 production method which uses water and an organic solvent to perform interfacial polycondensation between tetramethylene diamine (water phase) and adipoyl chloride (organic phase). As described in Non-patent document 1, however, tetramethylene diamine is high in hydrophilicity and low in the rate of flow into the organic phase that contains adipoyl chloride, resulting a very low rate of polymerization. Furthermore, hydrolysis of adipoyl chloride takes place concertedly, making it very difficult to perform interfacial polycondensation up to a high degree of polymerization.

For production of nylons 48, 410, and 412, Patent document 2 has disclosed a two-step polymerization method that consists of oligomer preparation and solid phase polymerization as in the case of the nylon 46 production method.

PRIOR ART DOCUMENTS

Patent Documents

Patent document 1: Japanese Unexamined Patent Publication (Kokai) No. SHO 56-149431
Patent document 2: WO 00/09586

Non-Patent Documents

Non-patent document 1: J. Polym. Sci. Polym. Chem. Ed. Vol. 15, 537-545 (1977)

SUMMARY OF THE INVENTION

Problems to be Solved by the Invention

The invention provides a method for producing white polyamide resin with a high degree of polymerization that comprises tetramethylene diamine as the primary constituent and has a high retention stability.

Means of Solving the Problems

The inventors has succeeded in producing polyamide resin in a single-step melt polymerization process after finding that cyclization reaction of tetramethylene diamine depends on the quantity of water existing in the reaction system at a specific temperature and that polyamide resin produced through polycondensation of tetramethylene diamine and an aliphatic dicarboxylic acid with a carbon number of 7 or more has a very high melt retention stability.

Specifically, the invention provides:
(i) A method for producing polyamide resin comprising thermal polycondensation of tetramethylene diamine and either an aliphatic dicarboxylic acid with a carbon number of 7 or more or a salt thereof and continuing melt polymerization at a temperature equal to or higher than the melting point until the relative viscosity in 98% sulfuric acid solution with a 0.01 g/ml content at 25° C. comes in the range of 2.2 or more and 5.0 or less.
(ii) A polyamide resin production method as described in paragraph (i) wherein the water content in the starting material is reduced to 30 wt % or less at a temperature lower than 201° C.
(iii) A method for producing polyamide resin as described in either paragraph (i) or (ii) wherein the condensed water is removed at or above 201° C.
(iv) A method for producing polyamide resin as described in any of paragraphs (i) to (iii) wherein the maximum pressure is 1 kg/cm$^2$ or more and 25 kg/cm$^2$ or less.
(v) Polyamide resin produced by thermal polycondensation of tetramethylene diamine and either a aliphatic dicarboxylic acid with a carbon number of 7 or more or a salt thereof, having a chemical structure comprising amide group derived from the aforementioned compounds as repeating units, and having a degree of dispersion (weight average molecular weight/number average molecular weight) of 2.7 or less as measured by gel permeation chromatography.
(vi) Polyamide resin as described in paragraph (v) wherein the pyrrolidine content is $8.0 \times 10^{-5}$ mol/g or less.
(vii) Polyamide resin as described in either paragraph (v) or (vi) wherein the ratio, B/A, between the relative viscosity of its sulfuric acid solution after melt retention for 30 minutes at a temperature 20° C. higher than the melting point, B, and the relative viscosity of its sulfuric acid solution before the melt retention, A, is 0.7 or more and 1.5 or less.
(viii) Polyamide resin as described in any of paragraphs (v) to (vii) wherein said dicarboxylic acid with a carbon number of 7 or more is azelaic acid, sebacic acid, undecanedioic acid, or dodecanedioic acid.
(ix) A polyamide resin composition as described in any of paragraphs (v) to (viii) further comprising an inorganic filler.
(x) A polyamide resin composition as described in any of paragraphs (v) to (viii) further comprising an impact strength modifier.
(xi) A polyamide resin composition as described in any of paragraphs (v) to (viii) further comprising a flame retarder.

Effect of the Invention

The invention can provide a method for producing a white polyamide resin with a high degree of polymerization and high retention stability.

BRIEF DESCRIPTION OF THE DRAWINGS

FIG. 1 is a diagram illustrating the molecular weight distributions of the polyamide resin samples produced in Example 1, Example 13, Comparative example 1, and Comparative example 4 for the invention.

DESCRIPTION OF EMBODIMENTS

To produce a white, high-molecular weight polyamide resin comprising tetramethylene diamine as a constituent, it has been conventionally necessary to perform two-step polymerization process consisting of oligomer preparation and solid phase polymerization of separated oligomers at a temperature below the melting point. The present invention relates to a single-step melt polymerization process in which thermal polycondensation of tetramethylene diamine and either an aliphatic dicarboxylic acid with a carbon number of 7 or more or a salt thereof is directly followed by melt polymerization at a temperature above the melting point without separating the oligomers. Thermal polycondensation as referred to here is defined as a production process in which a maximum temperature is raised to 201° C. or higher.

Examples of said dicarboxylic acid with a carbon number of 7 or more used for the invention include pimelic acid, suberic acid, azelaic acid, sebacic acid, undecanedioic acid, dodecanedioic acid, tridecanedioic acid, tetradecanedioic acid, pentadecanedioic acid, hexadecanedioic acid, heptadecanedioic acid, octadecanedioic acid, 1,2-cyclohexanedicarboxylic acid, 1,3-cyclohexanedicarboxylic acid, and 1,4-cyclohexanedicarboxylic acid, which may be used as a combination of two or more thereof. In particular, azelaic acid, sebacic acid, undecanedioic acid, and dodecanedioic acid are preferred because of their well-balanced heat resistance and melt retention stability.

For the invention, if the total weight of said tetramethylene diamine and said aliphatic dicarboxylic acid with a carbon number of 7 or more accounts for not less than 70 wt %, the above monomers may be copolymerized with other components. Examples of copolymerization units that account for less than 30 wt % include aliphatic diamines such as ethylene diamine, 1,3-diaminopropane, 1,5-diaminopentane, 1,6-diaminohexane, 1,7-diaminoheptane, 1,8-diaminooctane, 1,9-diaminononane, 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane, 1,18-diaminooctadecane, 1,19-diaminononadecane, 1,20-diaminoeicosane, 2-methyl-1,5-diaminopentane, and 2-methyl-1,8-diaminooctane; alicyclic diamines such as cyclohexane diamine and bis-(4-aminocyclohexyl)methane; aromatic diamines such as xylylene diamine; aliphatic dicarboxylic acids such as oxalic acid, malonic acid, succinic acid, glutaric acid, and adipic acid; alicyclic dicarboxylic acids such as cyclohexanedicarboxylic acid; aromatic dicarboxylic acids such as phthalic acid, isophthalic acid, and naphthalene dicarboxylic acid; amino acids such as 6-aminocaproic acid, 11-aminoundecanoic acid, 12-aminododecanoic acid, para-aminomethyl benzoic acid; and lactams such as ε-caprolactam and ω-laurolactam.

Tetramethylene diamine used for the invention forms pyrrolidine (monoamine) in a cyclization reaction (deammoniation reaction) at a high temperature, it acts as a terminal blocking agent, and therefore, it is difficult to product a polyamide with a high degree of polymerization, comprising tetramethylene diamine as a constituent by single-step melt polymerization process, in which polymerization was carried out at the temperature above the melting point, known as methods for producing conventional nylon such as nylon 66 etc. Furthermore, nylon 46, a polyamide resin well known to comprise tetramethylene diamine as a constituent, is inferior in melt retention stability and, when heated above the melting point (290° C.), suffers not only serious decomposition reaction but also side reaction involving cyclization of tetramethylene diamine. To produce a polyamide resin with a high degree of polymerization comprising tetramethylene diamine as a constituent, therefore, it is of primary importance to control the cyclization side reaction of tetramethylene diamine.

Cyclization reaction of tetramethylene diamine tends to be accelerated as the quantity of water in the reaction system increases, and therefore, control of the quantity of water is effective for depressing this cyclization reaction. As the cyclization reaction of tetramethylene diamine progresses rapidly at 201° C. or above, it is effective to remove water from materials at a temperature lower than 201° C. For the invention, it is preferable that the starting material is concentrated to a water content of below 30 wt % at a temperature below 201° C. It is more preferably 20 wt % or less, still more preferably 10 wt % or less, and most preferably 5 wt % or less. Note that condensed water is not included in the water content in the starting material at below 201° C. It is preferable that this concentration step is carried out under a pressure of 0.5 to 5 kg/cm$^2$ because volatilization of tetramethylene diamine is depressed during this step. The pressure is more preferably 1 to 4 kg/cm$^2$. The water content in the starting material at a temperature below 201° C. can be determined by subtracting the quantity of water removed below 201° C. from the quantity of water fed at the beginning.

In addition, not only the water contained in the starting material, but also the condensed water generated during the process producing polyamide resin should be removed efficiently to depress the cyclization reaction. As the condensation reaction is accelerated at and above 201° C., it is preferable for the invention to incorporate a step of removing water at or above 201° C. The temperature is more preferably 210° C. or higher.

As the temperature in the reaction system rises, the pressure in the reaction system increases as a result of volatilization of the water in the starting material as well as the condensed water, it is preferable for the invention to remove water under a pressure of 25 kg/cm$^2$ or less. The pressure is more preferably 18 kg/cm$^2$ or less, still more preferably 10 kg/cm$^2$ or less, and most preferably 5 kg/cm$^2$ or less. If the pressure is more than 25 kg/cm$^2$, the volatilization of water is depressed while the cyclization of tetramethylene diamine is accelerated considerably, as a consequence it is difficult to produce a polyamide resin with a high degree of polymerization.

For the invention, a high degree of polymerization is achieved at the final step of the polymerization process at a temperature at or above the melting point in an inert gas atmosphere or under a reduced pressure. It is preferable to perform this in an inert gas atmosphere such as nitrogen gas. If it is carried out under a reduced pressure for an extended time at or above the melting point, a polyamide resin tends to color.

The invention is designed to produce polyamide resin with a high degree of polymerization in a single-step melt polymerization process, and it is necessary that the relative viscosity in 98% sulfuric acid solution with a 0.01 g/ml content at 25° C. is 2.2 to 5.0. It is more preferably 2.3 to 4.5 and still more preferably 2.5 to 4.0. If the relative viscosity is less than 2.2, the toughness of polyamide resin tends to decrease. If the relative viscosity is more than 5.0, on the other hand, molding processability tends to deteriorate.

Polyamide resin with a relative viscosity of 2.2 to 5.0 produced according to the invention may be further subjected to solid phase polymerization at a temperature of 100° C. or more and below the melting point under a reduced pressure or in an inert gas.

For the invention, polymerization reaction should be performed at a high temperature, in this case because tetramethylene diamine and pyrrolidine resulting from its cyclization reaction volatilize and also because the pyrrolidine acts as a terminal blocking agent, the total quantity of the amino group relative to the total quantity of the carboxyl group in the polymerization reaction system tends to decrease as the polymerization proceeds. As a result, the rate of polymerization becomes slow. For the invention, a higher pressure in the polymerization reaction system is more preferable for effective suppression of the volatilization of tetramethylene diamine, but on the other hand, the volatilization of condensed water is suppressed to accelerate the cyclization of tetramethylene diamine, resulting in a preferable maximum pressure in the polymerization reaction system of 1 to 25 kg/cm$^2$. It is more preferably 2 to 20 kg/cm$^2$, still more preferably 2 to 15 kg/cm$^2$, and most preferably 3 to 10 kg/cm$^2$. If the pressure is less than 1 kg/cm$^2$, the volatilization of tetramethylene diamine cannot be suppressed efficiently, leading to a large disruption in the molar balance between the amino group and the carboxyl group. If the pressure is more than 25 kg/cm$^2$, on the other hand, elimination of water during polycondensation tends to be suppressed to prevent the degree of polymerization from increasing Application of a pressure may not be necessary at the beginning of the polymerization step because condensed water is produced to increase the pressure in the reaction system as the polycondensation proceeds. If the volatilization of tetramethylene diamine is to be minimized, however, water may be added in the starting material in advance or a pressure may be applied at the beginning of the polymerization step using an inert gas in order to maintain the pressure in the reaction system to a high level.

To obtain a high-molecular weight polyamide resin, it is preferable that a certain excessive quantity of tetramethylene diamine is added in advance at the time of feeding the starting material to increase the quantity of the amino group in the polymerization reaction system. It is preferable to adjust the proportions of the starting materials so that the ratio a/b between the number of moles of tetramethylene diamine used as a starting material, a, and that of the dicarboxylic acid with a carbon number of 7 or more, b, is in the range of 1.002 to 1.07, and it is more preferable to adjust the proportions of the starting materials to bring the ratio in the range of 1.01 to 1.06. If a/b is less than 1.002, the total quantity of the amino group in the polymerization reaction system tends to be extremely low as compared with the total quantity of the carboxyl group, making it impossible to produce a high-molecular weight polymer. If a/b is larger than 1.07, on the other hand, the total quantity of the carboxyl group in the polymerization reaction system tends to be extremely low as compared with the total quantity of the amino group, making it impossible to produce a high-molecular weight polymer. In addition, vaporization of the diamine component will also increase, leading to an unfavorable effect on the productivity and environment.

For the invention, the methods available for producing a salt of tetramethylene diamine and an aliphatic dicarboxylic acid with a carbon number of 7 or more to be used as starting materials include: salt reaction in water or a mixture of water and alcohol followed by evaporation of the solvent; and salt reaction in alcohol followed by recovery of the precipitated salt. Methanol and ethanol have been preferred as component of the alcohol solvent. Here, the aqueous salt solution resulting from the salt reaction in water may be used directly as the starting material.

For the invention, minimizing the heat history undergone by the polymer over the entire polymerization step is effective in suppressing the volatilization of tetramethylene diamine and the cyclization due to the deammoniation reaction and preventing the coloring, and lowering the maximum temperature in the polymerization reaction system is a preferable means for this purpose. For the invention, the maximum temperature in the polymerization reaction system is preferably in the range of from the melting point of the polyamide resin and below 290° C., more preferably from the melting point to a temperature 30° C. higher than the melting point. If the temperature is 290° C. or higher, the cyclization of tetramethylene diamine tends to be accelerated.

As compared with the polyamide resin produced by the two-step polymerization, the polyamide resin produced by the single-step melt polymerization according to the invention has a small degree of dispersion (weight average molecular weight/number average molecular weight) of 2.7 or less as measured by gel permeation chromatography. It is more preferably 2.5 or less, and most preferably 2.4 or less. It is likely that the polymerization proceeds more uniformly in the single-step melt polymerization process in which heat transfer is uniform, relative to the two-step polymerization process in which heat transfer is not uniform. A degree of dispersion of higher than 2.7 tends to lead to a relatively large quantity of low molecular weight components, an increased gas generation during molding process, and a reduction in toughness.

The pyrrolidine resulting from the cyclization reaction of tetramethylene diamine acts as polymerization terminator to reduce the rate of polymerization, and therefore, the content of pyrrolidine contained in polyamide resin is preferably $8.0 \times 10^{-5}$ mol/g or less. It is more preferably $4.0 \times 10^{-5}$ mol/g or less, still more preferably $2.5 \times 10^{-5}$ mol/g or less, and most preferably $1.5 \times 10^{-5}$ mol/g or less. If the pyrrolidine content is more than $8.0 \times 10^{-5}$ mol/g, the polymerization time tends to become longer and to increase a degree of polymerization tends to become difficult.

Polyamide resin according to the invention has a high melt retention stability. The ratio B/A between the relative viscosity in sulfuric acid solution after polyamide resin is retained in melt state for 30 min at a temperature 20° C. higher than the melting point, B, and the relative viscosity in sulfuric acid solution before the retention, A, is preferably 0.7 or more and 1.5 or less. It is more preferably 0.8 or more and 1.3 or less, and still more preferably 1.0 or more and 1.2 or less. If B/A is less than 0.7, polyamide resin tends to be decomposed seriously during melt process such as molding, resulting in coloring, and therefore it is not preferable. If B/A is larger than 1.5, the resin tends to increase in viscosity when melted, leading to deterioration in processability.

Unlike the polyamide resin according to the invention, nylon 46, a typical polyamide resin comprising tetramethylene diamine as a constituent is generally low in melt retention stability, which may be attributed to its high melting point. According to Polymer Degradation and Stability, 78, 369-378 (2002), the adipic acid portion of nylon 66 cyclizes at high temperatures to form a cyclopentanone, leading to decomposition while cutting molecular chains. From this mechanism, it is very likely that decomposition of nylon 46 is also accelerated by the cyclization of the adipic acid portion. The invention uses an aliphatic dicarboxylic acid with a carbon number of 7 or more, the polyamide resin has a melting point below 290° C., and the aliphatic dicarboxylic acid is not cyclized by heat decomposition. Therefore, the resulting polyamide resin probably has the high melt retention stability. For instance, the nylon 410 sample produced in Example 2 for the invention maintains a B/A ratio of 1.10 and shows no tendency of decomposition even during melt retention for 30 minutes at 310° C. which is higher than the melting point of nylon 46. It is likely that the high melt retention stability of the polyamide resin according to the invention makes it possible to perform single-step melt polymerization which is the primary objective of the invention.

For the invention, a polymerization accelerator can be added as needed. Preferable examples of said polymerization accelerator include, for instance, inorganic phosphorus compounds such as phosphoric acid, phosphorous acid, hypophosphorous acid, pyrophosphoric acid, and polyphosphoric acid as well as alkali metal salts and alkaline earth metal salts thereof, of which sodium phosphite and sodium hypophosphite are particularly preferred. It is preferable that the content of said polymerization accelerator is in the range of 0.001 to 1 part by weight per 100 parts by weight of the starting materials. If the content of said polymerization accelerator is less than 0.001 parts by weight, its addition will not have a significant effect, whereas if it is more than 1 part by weight, the resulting polyamide resin tends to have an excessively high degree of polymerization, making melt molding difficult.

The polyamide resin according to the invention may contain an inorganic filler, another polymer, a flame retarder, or other substances to form a polyamide resin composition. Said inorganic filler may be a generally known substance used as filler for resin. Examples include glass fiber, carbon fiber, potassium titanate whisker, zinc oxide whisker, aluminum borate whisker, aramid fiber, alumina fiber, silicon carbide fiber, ceramic fiber, asbestos fiber, gypsum fiber, metal fiber, wollastonite, zeolite, scricite, kaolin, mica, talc, clay, pyrophyllite, bentonite, montmorillonite, hectorite, synthesize mica, asbestos, aluminosilicate, alumina, silicon oxide, magnesium oxide, zirconium oxide, titanium oxide, iron oxide, calcium carbonate, magnesium carbonate, dolomite, calcium sulfate, barium sulfate, magnesium hydroxide, calcium hydroxide, aluminum hydroxide, glass beads, ceramic beads, boron nitride, silicon carbide, and silica. These may be hollow, and two or more of these inorganic fillers may be used in combination. In the case of swellable layer silicates of bentonite, montmorillonite, hectorite, synthesize mica, etc., organized layered silicates produced by cation exchange of interlayer ions with an organic ammonium salt may be used. To reinforce polyamide resin, it is preferable to use glass fiber and carbon fiber among other fillers listed above. To improve the surface appearance of a polyamide resin composition, it is preferable to use an inorganic filler with an average particle diameter of 0.001 to 10 μm. If the average particle diameter is less than 0.001 μm, the resulting polyamide resin composition has a considerably poor melt processability, and therefore, it is not preferable. If the particle diameter is more than 10 μm, the resulting moldings tend to have poor surface appearance. The average particle diameter is preferably 0.01 to 5 μm, more preferably 0.05 to 3 μm. The above-mentioned average particle diameter is measured by the precipitation method. To achieve both the reinforcement of polyamide resin and the excellent surface appearance, it is preferable to use talc, kaolin, wollastonite, or swellable layer silicate as inorganic filler.

To achieve high mechanical strength, it is preferable that these inorganic fillers are subjected to preliminary treatment with a coupling agent such as isocyanate based compound, organic silane based compound, organic titanate based compound, organic borane based compound, and epoxy compound. Use of an organic silane based compound is particularly preferable, and specific examples include alkoxysilane compounds containing an epoxy group such as γ-glycidoxy propyl trimethoxysilane, γ-glycidoxy propyl triethoxy silane, and β-(3,4-epoxy cyclohexyl)ethyl trimethoxysilane; alkoxysilane compounds containing a mercapto group such as γ-mercaptopropyl trimethoxysilane and γ-mercaptopropyl triethoxysilane; alkoxysilane compounds containing a ureido group such as γ-ureidopropyl triethoxysilane, γ-ureidopropyl trimethoxysilane, and γ-(2-ureidoethyl) aminopropyl trimethoxysilane; alkoxysilane compounds containing an isocyanato group such as γ-isocyanatopropyl triethoxysilane, γ-isocyanatopropyl trimethoxysilane, γ-isocyanatopropyl methyl dimethoxysilane, γ-isocyanatopropyl methyl diethoxysilane, γ-isocyanatopropyl ethyl dimethoxysilane, γ-isocyanatopropyl ethyl diethoxysilane, and γ-isocyanatopropyl trichlorosilane; alkoxysilane compounds containing an amino group such as γ-(2-aminoethyl)aminopropyl methyl dimethoxysilane, γ-(2-aminoethyl)aminopropyl trimethoxysilane, and γ-aminopropyl trimethoxysilane; alkoxysilane compounds containing a hydroxyl group such as γ-hydroxypropyl trimethoxysilane and γ-hydroxypropyl triethoxysilane; alkoxysilane compounds containing a unsaturated carbon-carbon group such as γ-methacryloxy propyl trimethoxysilane, vinyl trimethoxysilane, and N-β-(N-vinyl benzyl aminoethyl)-γ-aminopropyl trimethoxysilane hydrochloride; and alkoxysilane compounds containing an anhydride group such as 3-trimethoxysilyl propylsuccinic anhydride. In particular, γ-methacryloxy propyl trimethoxysilane, γ-(2-aminoethyl)aminopropyl methyl dimethoxysilane, γ-(2-aminoethyl)aminopropyl trimethoxysilane, γ-aminopropyl trimethoxysilane, and 3-trimethoxysilyl propylsuccinic anhydride are preferably used. The ordinary method in which the surface of fillers are pretreated with these silane coupling agents and subsequently they are melt-kneaded with polyamide resin is preferably used. The so-called integral blending method in which pretreatment of fillers is not performed and silane coupling agents are added at the time of melt-kneading the fillers and polyamide resin may be used.

These coupling agents used for treatment preferably account for 0.05 to 10 parts by weight per 100 parts by weight of the inorganic fillers. The quantity is more preferably 0.1 to 5 parts by weight, and most preferably 0.5 to 3 parts by weight. If it is less than 0.05 parts by weight, treatment with the coupling agent cannot work effectively to improve the mechanical characteristics, whereas if it is more than 10 parts by weight, the inorganic filler tends to aggregate easily, resulting in poor dispersion in the polyamide resin.

For the invention, the added inorganic filler preferably accounts for 0.1 to 200 parts by weight per 100 parts by weight of the polyamide resin. The quantity is more preferably 1 to 100 parts by weight, still more preferably 1.1 to 60 parts by weight, and most preferably 5 to 50 parts by weight. If it is less than 0.1 parts by weight, the rigidity and strength are not improved significantly, whereas if it is more than 200 parts by weight, uniform dispersion in the polyamide resin tends to be difficult, possibly leading to a decreased strength.

In addition to the treatment of the inorganic filler with a coupling agent, it is preferable to add at least one anhydride selected from the group of maleic anhydride, itaconic anhydride, glutaconic anhydride, citraconic anhydride, anhydride aconitic acid, and polymaleic anhydride to reinforce the interface between the polyamide resin and the inorganic filler. Of these, maleic anhydride and polymaleic anhydride are preferably used because toughness and rigidity of the polyamide resin composition are maintained in good balance. As said polymaleic anhydride, the one described in J. Macromol. Sci.-Revs. Macromol. Chem., C13(2), 235 (1975), for instance, may be used.

The content of these anhydrides is preferably 0.05 to 10 parts by weight per 100 parts by weight of the polyamide resin from the viewpoint of improvement in ductility and flowability of the resulting composition, and it is more preferably in the range of 0.1 to 5 parts by weight, still more preferably 0.1 to 3 parts by weight, and still more preferably 0.1 to 1 part by weight.

Here, said anhydrides are only required to have the anhydride structure at the time of actually being melt-kneaded with the polyamide resin and inorganic filler, and may be fed to the melt-kneading step in the form of a carboxylic acid resulting from its hydrolysis or its aqueous solution so that it is dehydrated by the heat of the melt-kneading step and melt-kneaded with a nylon resin virtually in the form of an anhydride.

Examples of said another polymer include other polyamides, polyethylene, polypropylene, polyester, polycarbonate, polyphenylene ether, polyphenylene sulfide, liquid crystalline polymer, polysulfone, polyethersulfone, ABS resin, SAN resin, and polystyrene, and with the aim of improving the impact resistance of the polyamide resin according to the invention, modified polyolefins such as (co)polymers produced by polymerizing an olefin-based compound and/or conjugated diene-based compound are used preferably.

Examples of said (co)polymer include ethylene-based copolymer, conjugated diene-based polymer, and conjugated diene-aromatic vinyl hydrocarbon-based copolymer.

Here, said ethylene-based copolymer is a copolymer or multicomponent copolymer comprising ethylene and another monomer, and said monomer to be copolymerized with ethylene may be selected from the group of α-olefin with a carbon number of 3 or more, unconjugated diene, vinyl acetate, vinyl alcohol, α,β-unsaturated carboxylic acid, and a derivative thereof.

Examples of said α-olefin with a carbon number of 3 or more include propylene, butene-1, pentene-1,3-methyl pentene-1, and octacene-1, of which propylene and butene-1 are preferably used. Examples of said unconjugated dienes include norbornene compounds such as 5-methylidene-2-norbornene, 5-ethylidene-2-norbornene, 5-vinyl-2-norbornene, 5-propenyl-2-norbornene, 5-isopropenyl-2-norbornene, 5-crotyl-2-norbornene, 5-(2-methyl-2-butenyl)-2-norbornene, 5-(2-ethyl-2-butenyl)-2-norbornene, and 5-methyl-5-vinyl norbornene; and others such as dicyclopentadiene, methyl tetrahydroindene, 4,7,8,9-tetrahydroindene, 1,5-cyclooctadiene-1,4-hexadiene, isoprene, 6-methyl-1,5-heptadiene, and 11-trideca diene; of which 5-methylidene-2-norbornene, 5-ethylidene-2-norbornene, dicyclopentadiene, and 1,4-hexadiene are preferably used. Examples of said α,β-unsaturated carboxylic acid include acrylic acid, methacrylic acid, ethacrylic acid, crotonic acid, maleic acid, fumaric acid, itaconic acid, citraconic acid, and butenedicarboxylic acid, and examples of said derivative thereof include alkyl ester, allyl ester, glycidyl ester, anhydride, and imide.

Said conjugated diene-based polymer is a polymer comprising at least one conjugated diene as a constituent, and examples include, for instance, homopolymers comprising 1,3-butadiene or copolymers containing one or more monomers selected from the group of 1,3-butadiene, isoprene(2-methyl-1,3-butadiene), 2,3-dimethyl-1,3-butadiene, and 1,3-pentadiene. Furthermore, polymers produced by reducing some or all of the unsaturated bonds through hydrogenation are also preferably used.

Said conjugated diene-aromatic vinyl hydrocarbon based copolymer is a block copolymer or a random copolymer comprising both a conjugated diene and an aromatic vinyl hydrocarbon, and examples of said conjugated diene to constitute it include the monomers listed above, of which 1,3-butadiene and isoprene are preferably used. Examples of said aromatic vinyl hydrocarbon include styrene, α-methyl styrene, o-methyl styrene, p-methyl styrene, 1,3-dimethyl styrene, and vinyl naphthalene, of which styrene is preferably used. Furthermore, polymers produced by reducing some or all of the unsaturated bonds outside the aromatic ring through hydrogenation in said conjugated diene-aromatic vinyl hydrocarbon-based copolymer are also preferably used.

Polyamide based elastomers and polyester based elastomers may also be used. These impact strength modifiers may be used as a combination of two or more thereof.

Specific examples of these impact strength modifiers include ethylene/propylene copolymer, ethylene/butene-1 copolymer, ethylene/hexene-1 copolymer, ethylene/propylene/dicyclopentadiene copolymer, ethylene/propylene/5-ethylidene-2-norbornene copolymer, unhydrogenated or hydrogenated styrene/isoprene/styrene triblock copolymer, unhydrogenated or hydrogenated styrene/butadiene/styrene triblock copolymer, and ethylene/methacrylic acid copolymer; copolymers produced by converting some or all of the carboxylic acid portions in said copolymer into a salt with sodium, lithium, potassium, zinc, or calcium; ethylene/methyl acrylate copolymer, ethylene/ethyl acrylate copolymer, ethylene/methyl methacrylate copolymer, ethylene/ethyl methacrylate copolymer, ethylene/ethyl acrylate-g-maleic anhydride copolymer, (hereinafter "g" representing "graft"), ethylene/methyl methacrylate-g-maleic anhydride copolymer, ethylene/ethyl acrylate-g-maleimide copolymer, ethylene/ethyl acrylate-g-N-phenyl maleimide copolymer, and partially saponified products of these copolymers; and others such as ethylene/glycidylmethacrylate copolymer, ethylene/vinyl acetate/glycidylmethacrylate copolymer, ethylene/methyl methacrylate/glycidylmethacrylate copolymer, ethylene/glycidyl acrylate copolymer, ethylene/vinyl acetate/glycidyl acrylate copolymer, ethylene/glycidyl ether copolymer, ethylene/propylene-g-maleic anhydride copolymer, ethylene/butene-1-g-maleic anhydride copolymer, ethylene/propylene/1,4-hexadiene-g-maleic anhydride copolymer, ethylene/propylene/dicyclopentadiene-g-maleic anhydride copolymer, ethylene/propylene/2,5-norbornadiene-g-maleic anhydride copolymer, ethylene/propylene-g-N-phenyl maleimide copolymer, ethylene/butene-1-g-N-phenyl maleimide copolymer, hydrogenated styrene/butadiene/styrene-g-maleic anhydride copolymer, hydrogenated styrene/isoprene/styrene-g-maleic anhydride copolymer, ethylene/propylene-g-glycidyl methacrylate copolymer, ethylene/butene-1-g-glycidyl methacrylate copolymer, ethylene/propylene/1,4-hexadiene-g-glycidyl methacrylate copolymer, ethylene/propylene/dicyclopentadiene-g-glycidyl methacrylate copolymer, hydrogenated styrene/butadiene/styrene-g-glycidyl methacrylate copolymer, nylon 12/polytetramethylene glycol copolymer, nylon 12/polytrimethylene glycol copolymer, polybutylene terephthalate/polytetramethylene glycol copolymer, and polybutylene terephthalate/polytrimethylene glycol copolymer. Above all, it is preferable that ethylene/methacrylic acid copolymer, copolymers produced by converting some or all of the carboxylic acid portions in said copolymer into a salt with sodium, lithium, potassium, zinc, or calcium, ethylene/propylene-g-maleic anhydride copolymer, ethylene/butene-1-g-maleic anhydride copolymer, and hydrogenated styrene/butadiene/styrene-g-maleic anhydride copolymer are used.

Moreover, it is particularly preferable that ethylene/methacrylic acid copolymer, copolymers produced by converting some or all of the carboxylic acid portions in said copolymer into a salt with sodium, lithium, potassium, zinc, or calcium, ethylene/propylene-g-maleic anhydride copolymer, and ethylene/butene-1-g-maleic anhydride copolymer are used.

For the invention, the content of the impact strength modifier is preferably 5 to 100 parts by weight per 100 parts by weight of the polyamide resin. It is more preferably 5 to 50 parts by weight, still more preferably 10 to 40 parts by weight, and most preferably 10 to 30 parts by weight. If it is less than 5 parts by weight, the impact resistance will not be improved significantly, whereas if it is more than 100 parts by weight, melt viscosity tends to be too high, leading to an inferior molding processability.

Flame retarders that can be used for the invention include halogen-free flame retarders that do not contain halogen atoms such as phosphorous flame retarders, nitrogen based flame retarders, and metal hydroxide based flame retarders; and halogen-based flame retarders such as bromine based flame retarders, and these flame retarders may be used singly or as a combination of two or more thereof.

The content of these flame retarders is preferably 1 to 50 parts by weight per 100 parts by weight of the polyamide resin. If the content is less than 1 part by weight, the flame retardance tends to be poor. If it is more than 50 parts by weight, on the other hand, the toughness tends to be considerably low.

Examples of said phosphorous flame retarders include polyphosphoric acid based compound such as red phosphorus, ammonium polyphosphate, melamine polyphosphate, metal (di)phosphinate, phosphazene compound, aromatic phosphate, aromatic condensed phosphate, and halogenated phosphate.

A (di)phosphinate is produced from, for instance, phosphinic acid along with a metal carbonate, metal hydroxide or metal oxide in an aqueous medium. A (di)phosphinate is essentially a monomeric compound, but depending on the reaction conditions, it can be a polymeric phosphinate with a degree of polymerization of 1 to 3 in a certain environment. Examples of said phosphinic acid include dimethyl-phosphinic acid, ethyl-methyl-phosphinic acid, diethyl-phosphinic acid, methyl-n-propyl phosphinic acid, methane-di(methyl-phosphinic acid), benzene-1,4-(dimethyl-phosphinic acid), methyl-phenyl-phosphinic acid, and diphenyl-phosphinic acid. Examples of the metal component (M) to be reacted with said phosphinic acid include a metal carbonate, metal hydroxide, and metal oxide containing calcium ion, magnesium ion, aluminum ion and/or zinc ion. Examples of said phosphinate include calcium dimethyl-phosphinate, magnesium dimethyl-phosphinate, aluminum dimethyl-phosphinate, zinc dimethyl-phosphinate, calcium ethyl-methyl-phosphinate, magnesium ethyl-methyl-phosphinate, aluminum ethyl-methyl-phosphinate, zinc ethyl-methyl-phosphinate, calcium diethyl-phosphinate, magnesium diethyl-phosphinate, aluminum diethyl-phosphinate, zinc diethyl-phosphinate, calcium methyl-n-propyl-phosphinate, magnesium methyl-n-propyl phosphinate, aluminum methyl-n-propyl-phosphinate, zinc methyl-n-propyl-phosphinate, calcium methyl-phenyl-phosphinate, magnesium methyl-phenyl-phosphinate, aluminum methyl-phenyl-phosphinate, zinc methyl-phenyl-phosphinate, calcium diphenyl-phosphinate, magnesium diphenyl-phosphinate, aluminum diphenyl-phosphinate, and zinc diphenyl-phosphinate. Examples of said diphosphinate include calcium methane-di(methyl phosphinate), magnesium methane-di(methyl phosphinate), aluminum methane-di(methyl phosphinate), zinc methane-di(methyl phosphinate), calcium benzene-1,4-di(methyl phosphinate), magnesium benzene-1,4-di(methyl phosphinate), aluminum benzene-1,4-dimethyl phosphinate), and zinc benzene-1,4-di(methyl phosphinate). Of these (di)phosphinates, aluminum ethyl-methyl-phosphinate, aluminum diethyl-phosphinate, and zinc diethyl-phosphinate are particularly preferable from the viewpoint of flame retardance and electric characteristics.

Said phosphazene compound is an organic compound containing a —P=N-bond in its molecule, and preferably at least one compound selected from the group of cyclic phenoxy phosphazene compound, linear phenoxy phosphazene compound, and crosslinked phenoxy phosphazene compound. Examples of said cyclic phenoxy phosphazene compound include, for instance, phenoxy cyclotriphosphazene, octaphenoxy cyclotetraphosphazene, decaphenoxy cyclopentaphosphazene, produced by substituting with a phenoxy group after extracting the cyclic chlorophosphazenes such as hexachlorocyclo-triphosphazene, octachlorocyclo-tetraphosphazene, and decachlorocyclo-pentaphosphazene, from a mixture of cyclic and linear chlorophosphazenes, obtained by reacting ammonium chloride and phosphorus pentachloride at a temperature of 120 to 130° C. Examples of said linear phenoxy phosphazene compound include, for instance, compounds produced by substituting linear dichlorophosphazene with a degree of polymerization of 3 to 10,000, obtained by ring opening polymerization of hexachlorocyclotriphosphazene prepared by the above method at 220 to 250° C., with a phenoxy group. Examples of said crosslinked phenoxy phosphazene compound include, for instance, compounds having a crosslinked structure of the 4,4'-diphenylene group, such as a compound having a crosslinked structure of 4,4'-sulfonyl diphenylene(bisphenol S residue), compound having a crosslinked structure of the 2,2-(4,4'-diphenylene)isopropylidene group, compound having a crosslinked structure of the 4,4'-oxydiphenylene group, and compound having a crosslinked structure of the 4,4'-thiodiphenylene group. The content of the phenylene group in a crosslinked phenoxy phosphazene compound is commonly 50 to 99.9%, preferably 70 to 90%, based on the total number of phenyl groups and phenylene groups in the cyclic phosphazene compound and/or linear phenoxy phosphazene compound. It is particularly preferable that said crosslinked phenoxy phosphazene compound does not contain a free hydroxyl group in its molecule.

Said aromatic phosphate is a compound produced by reacting a phosphorus oxychloride and a phenol or a mixture of a phenol and an alcohol. Examples of said aromatic phosphate include triphenyl phosphate, tricresyl phosphate, trixylenyl phosphate, cresyl diphenyl phosphate, 2-ethylhexyl diphenyl phosphate; butylated phenyl phosphate such as t-butyl phenyl diphenyl phosphate, bis-(t-butyl phenyl)phenyl phosphate, and tris-(t-butyl phenyl)phosphate; and propylated phenyl phosphate such as isopropyl phenyl diphenyl phosphate, bis-(isopropyl phenyl)diphenyl phosphate, and tris-(isopropyl phenyl)phosphate.

Said aromatic condensed phosphate is produced by reaction of a phosphorous oxychloride, a divalent phenolic compound, and a phenol (or alkyl phenol). Examples of said aromatic condensed phosphate include resorcinol bis-diphenyl phosphate, resorcinol bis-dixylenyl phosphate, and bisphenol A bis-diphenyl phosphate.

Said halogenated phosphate is produced by reacting alkylene oxide and phosphorus oxychloride under the existence of a catalyst. Examples of said halogenated phosphate include tris-(chloroethyl)phosphate, tris-(β-chloropropyl)phosphate, tris-(dichloropropyl)phosphate, tetrakis-(2-chloroethyl) dichloroisopentyl diphosphate, and polyoxy alkylene bis (dichloroalkyl)phosphate.

The content of phosphorous flame retarders is preferably 1 to 50 parts by weight per 100 parts by weight of the polyamide resin. It is more preferably 2 to 40 parts by weight, and still more preferably 3 to 35 parts by weight.

Examples of said nitrogen based flame retarder include compounds that form a salt of a triazine based compound and cyanuric acid or isocyanuric acid. Here, a salt of a triazine based compound and cyanuric acid or isocyanuric acid is an addition product of a triazine based compound and cyanuric acid or isocyanuric acid, which is commonly an addition product with a 1:1 (by mole) composition or in some cases with a 2:1 (by mole) composition. Of the triazine based compounds, those which do not form a salt with cyanuric acid or isocyanuric acid are excluded. Particularly preferable triazine based compounds which form salts with cyanuric acid or isocyanuric acid include melamine, mono(hydroxymethyl) melamine, di(hydroxymethyl)melamine, tri(hydroxymethyl) melamine, benzoguanamine, acetoguanamine, and 2-amide-4,6-diamino-1,3,5-triazine, of which melamine, benzoguanamine, and acetoguanamine are more preferably used. Specific examples of said salt of a triazine based compound and cyanuric acid or isocyanuric acid include melamine cyanurate, mono($\beta$-cyanoethyl)isocyanurate, bis ($\beta$-cyanoethyl)isocyanurate, and tris-($\beta$-cyanoethyl)isocyanurate, of which melamine cyanurate is particularly preferable.

The content of said nitrogen based flame retarder is preferably 1 to 50 parts by weight per 100 parts by weight of the polyamide resin. It is more preferably 3 to 30 parts by weight, and still more preferably 5 to 20 parts by weight.

Examples of said metal hydroxide based flame retarder include magnesium hydroxide and aluminum hydroxide, of which magnesium hydroxide is the more preferable. They are commercially available as common products, and there are no specific limitations on their particle diameter, specific surface area, shape, and the like, but preferably they are in the form of spheres, needles or small plates with a particle diameter of 0.1 to 20 mm and a specific surface area of 3 to 75 $m^2$/g. Said metal hydroxide based flame retarder may or may not be surface-treated. Surface treatment may be performed using a silane coupling agent, anion surface active agent, multivalent functional organic acid, epoxy resin or other thermosetting resins for coating.

The content of said metal hydroxide based flame retarder is preferably 1 to 50 parts by weight per 100 parts by weight of the polyamide resin. It is more preferably 10 to 50 parts by weight, and still more preferably 20 to 50 parts by weight.

There are no specific limitations on the bromine based flame retarder to be used for the invention if it is a compound containing bromine in its chemical structure, and generally known flame retarders may be used. They include monomer-typed organic bromine compounds such as hexabromobenzene, pentabromotoluene, hexabromobiphenyl, decabromobiphenyl, hexabromocyclodecane, decabromodiphenyl ether, octabromodiphenyl ether, hexabromodiphenyl ether, bis (pentabromophenoxy)ethane, ethylene-bis(tetrabromophthalimide), and tetrabromobisphenol A; brominated polycarbonate (for instance, polycarbonate oligomers produced from brominated bisphenol A as starting material, and their copolymers with bisphenol A), brominated epoxy compounds (for instance, diepoxy compounds produced through reaction of brominated bisphenol A and epichlorohydrin, and monoepoxy compounds produced through reaction of a brominated phenol and epichlorohydrin), poly(brominated benzyl acrylate), brominated polyphenylene ether, brominated bisphenol A, condensed product of cyanuric chloride and brominated phenol, brominated polystyrene such as brominated polystyrene, poly(brominated styrene), and crosslinked brominated polystyrene; and halogenated polymer-typed bromine compounds such as crosslinked or non-crosslinked brominated poly(methyl styrene); of which ethylene bis(tetrabromophthalimide), brominated epoxy polymer, brominated polystyrene, crosslinked brominated polystyrene, brominated polyphenylene ether, and brominated polycarbonate are preferable, and brominated polystyrene, crosslinked brominated polystyrene, brominated polyphenylene ether, and brominated polycarbonate are the most preferable.

The content of said bromine based flame retarder is preferably 1 to 50 parts by weight per 100 parts by weight of the polyamide resin. It is more preferably 10 to 50 parts by weight, and still more preferably 20 to 50 parts by weight.

It is also preferable to add a flame retardant assistant in combination with said brominated flame retarders for a synergistic effect in improving the flame retardance, and examples include antimony trioxide, antimony tetroxide, antimony pentoxide, antimony dodecaoxide, crystalline antimonic acid, sodium antimonate, lithium antimonate, barium antimonate, antimony phosphate, zinc borate, zinc stannate, basic zinc molybdate, calcium zinc molybdate, molybdenum oxide, zirconium oxide, zinc oxide, iron oxide, red phosphorus, swellable graphite, and carbon black. Of these, antimony trioxide and antimony pentoxide are preferable. The content of flame retardant assistants is preferably 0.2 to 30 parts by weight per 100 parts by weight of the polyamide resin from the viewpoint of their effect in improving the flame retardance. It is still more preferably 1 to 20 parts by weight.

There are no specific limitations on the method for adding an inorganic filler, another polymer, or a flame retarder to the polyamide resin according to the invention, but specific examples include melt-kneading after feeding the starting materials such as the polyamide resin, inorganic filler, and/or another polymer into a generally known melt-kneading machine such as uniaxial or biaxial extruder, Banbury mixer, kneader, and mixing roll.

When using a melt-kneading machine for uniform dispersion of inorganic fillers and other polymers in polyamide resin, it is effective to properly control the ratio L/D (screw length/screw diameter) of the melt-kneading machine, use/nonuse of vent, kneading temperature, residence time, and feeding position and quantity of each component. In general, a higher L/D ratio and a longer residence time in the melt-kneading machine are more preferable to promote uniform dispersion of these inorganic fillers and other polymers.

Furthermore, various additive, for instance, antioxidant, thermal stabilizer (hindered phenol type, hydroquinone type, phosphite type, substitution products thereof, halogenated copper, iodine compound, and the like), weathering agent (resorcinol type, salicylate type, benzotriazole type, benzophenone type, hindered amine type, and the like), mold releasing agent and lubricant (aliphatic alcohol, aliphatic amide, aliphatic bisamide, bisurea, polyethylene wax, and the like), pigment (cadmium sulfide, phthalocyanine, carbon black, and the like), dye (nigrosine, aniline black, and the like), plasticizer (octyl p-oxybenzoate, N-butyl benzene sulfone amide, and the like), antistatic agent (alkyl sulfate type anionic antistatic agent, quaternary ammonium salt type cationic antistatic agent, polyoxy ethylene sorbitan monostearate, other nonionic antistatic agent, betaine type amphoteric antistatic agent, and the like) may be added at an appropriate timing to the polyamide resin according to the invention, as long as they do not impair the effect of the invention.

Examples of said hindered phenol based antioxidant include 2,4-dimethyl-6-t-butyl phenol, 2,6-di-t-butyl phenol, 2,6-di-t-butyl-p-cresol, 2,6-di-t-butyl-4-ethyl phenol, 4,4'-butylidene bis(6-t-butyl-3-methyl phenol), 2,2'-methylene-bis(4-methyl-6-t-butyl phenol), 2,2'-methylene-bis(4-ethyl-6-t-butyl phenol), octadecyl-3-(3',5'-di-t-butyl-4'-hydroxyphenyl)propionate, tetrakis-[methylene-3-(3,5-di-t-butyl-4-hydroxyphenyl)propionate]methane, pentaerythrityl tetrakis-[3-(3',5'-di-t-butyl-4'-hydroxyphenyl)propionate], 3,9-bis[2-(3-(3-t-butyl-4-hydroxy-5-methyl phenyl)propionyloxy)-1,1-dimethylethyl]-2,4,8,10-tetraoxaspiro[5,5]undecane, 1,1,3-tris-(2-methyl-4-hydroxy-5-di-t-butyl phenyl)butane, tris-(3,5-di-t-butyl-4-hydroxybenzyl)isocyanurate, triethylene glycol-bis[3-(3-t-butyl-5-methyl-4-hydroxyphenyl)propionate], 1,6-hexanediol-bis[3-(3,5-di-t-butyl-4-hydroxyphenyl)propionate], 2,4-bis-(n-octyl thio)-6-(4-hydroxy-3,5-di-t-butylanilino)-1,3,5-triazine, 2,2-thiodiethylene bis[3-(3,5-di-t-butyl-4-hydroxyphenyl)propionate], N,N'-hexamethylene-bis(3,5-di-t-butyl-4-hydroxyhydrocinnamide), 3,5-di-t-butyl-4-hydroxybenzyl phosphonate diethyl ester, 1,3,5-trimethyl-2,4,6-tris-(3,5-di-t-butyl-4-hydroxybenzyl)benzene, 2,4-bis[(octyl thio)methyl]-o-cresol, and isooctyl-3-(3,5-di-t-butyl-4-hydroxyphenyl)propionate. In particular, ester type, high molecular weight hindered phenol is preferred, and more specifically, examples include tetrakis-[methylene-3-(3',5'-di-t-butyl-4'-hydroxyphenyl)propionate]methane, pentaerythrityl tetrakis-[3-(3',5'-di-t-butyl-4'-hydroxyphenyl)propionate], and 3,9-bis[2-(3-(3-t-butyl-4-hydroxy-5-methyl phenyl)propionyloxy)-1,1-dimethylethyl]-2,4,8,10-tetraoxaspiro[5,5]undecane.

Specific examples of said phosphite based compound include bis(2,6-di-t-butyl-4-methyl phenyl)pentaerythritol-di-phosphite, bis(2,4-di-t-butyl phenyl)pentaerythritol-di-phosphite, bis(2,4-di-cumyl phenyl)pentaerythritol-di-phosphite, tris-(2,4-di-t-butyl phenyl)phosphite, tetrakis (2,4-di-t-butyl phenyl)-4,4'-bisphenylene phosphite, di-stearyl pentaerythritol-di-phosphite, triphenyl phosphite, and 3,5-di-butyl-4-hydroxybenzyl phosphonate diethyl ester.

These antioxidants may be used singly, or two or more of them and may be used in combination because such combinations can have a synergistic effect. There are no specific limitations on the content of antioxidants. It is added preferably in the range of 0.01 to 20 parts by weight per 100 parts by weight of the polyamide resin.

Specific examples of said thermal stabilizers include inorganic acid copper salt compounds such as copper fluoride, copper chloride, copper bromide, copper iodide, copper halide, copper oxide, copper sulfate, and copper nitrate; and organic acid copper salt compounds such as copper acetate, copper laurate, copper stearate, copper naphthenate, and copper caprate, of which copper iodide and copper acetate are more preferable and copper iodide is still more preferable. Their content is 0.01 to 0.3 parts by weight, particularly preferably 0.01 to 0.1 parts by weight per 100 parts by weight of the polyamide resin.

Furthermore, a higher heat resistance can be achieved by using a copper compound and an alkali halide in combination. Examples of said alkali halide include, for instance, potassium iodide and magnesium iodide, of which potassium iodide is preferable. Their quantity is preferably in the proportion of 0.3 to 4 halogen atoms in the alkali halide per 1 copper atom in the copper compound.

The polyamide resin and the polyamide resin composition according to the invention can be molded into an intended shape by an appropriate molding method such as injection molding, extrusion molding, blow molding, vacuum molding, melting spinning, and film molding to produce resin moldings such as automobile parts and mechanical parts, as well as fiber and film. Specifically, their uses include automobile engine cooling water system parts, particularly radiator tank parts such as top and base components of radiator tank; water pump parts such as cooling water reserve tank, water pipe, water pump housing, water pump impeller, and valve; other parts used in contact with cooling water in automobile's engine room; and others such as various switches, ultrasmall slide switch, DIP switch, switch housing, lamp socket, banding band, connector, connector housing, connector shell, various IC socket, coil bobbin, bobbin cover, relay, relay box, capacitor case, motor's internal parts, small motor case, gear/cam, dancing pulley, spacer, insulator, fastener, buckle, wire clip, bicycle wheel, caster, helmet, terminal block, electric power tool housing, starter insulator component, spoiler, canister, radiator tank, chamber tank, reservoir tank, fuse box, air cleaner case, air conditioner fan, terminal housing, wheel cover, air intake and exhaust pipe, bearing retainer, cylinder head cover, intake manifold, water pipe impeller, clutch release, speaker diaphragm, heat resistant container, microwave oven parts, rice cooker parts, printer ribbon guide, and other electric/electronic related parts, automobile/vehicle related parts, home electric appliance/office electric device parts, computer related parts, facsimile/copier related parts, machine related parts, and other various parts.

EXAMPLES

[Relative Viscosity (ηr)]
Measurements were made in 98% sulfuric acid solution with a 0.01 g/ml concentration at 25° C. using an Ostwald viscometer.

[Melting point (Tm)]
Using a DSC RDC220 robot supplied by SII NanoTechnology Inc., a specimen of about 5 mg was sampled and measurements were made in a nitrogen atmosphere under the following conditions. The specimen was heated into a molten state at a temperature 35° C. higher than the melting point, then cooled down to 30° C. at a cooling rate of 20° C./min, held there for 3 minutes, and heated again at a heating rate of 20° C./min up to a temperature 35° C. higher than the melting point, followed by determining the temperature (melting point: Tm) at the endothermic peak observed. If two or more endothermic peaks were observed, the peak at the highest temperature was used as melting point.

[Melt Retention Stability]
A specimen was retained in a nitrogen atmosphere at a temperature 20° C. higher than the melting point for 30 minutes, followed by measuring the relative viscosity of the specimen and determining its ratio to the relative viscosity before the retention.

[Amino Terminal Group]
About 0.5 g of the polyamide resin was weighed accurately, dissolved in 25 ml of a phenol/ethanol mixed solvent (83.5:16.5 by volume), and titrated with a 0.02 N aqueous hydrochloric acid solution.

[Carboxy Terminal Group]
About 0.5 g of the polyamide resin was weighed accurately, dissolved in 20 ml of benzyl alcohol at 190° C., and titrated with a 0.02 N potassium hydroxide/ethanol solution.

[Pyrrolidine Terminal Group]
About 0.06 g of a specimen was weighed accurately, and hydrolyzed with an aqueous hydrobromic acid solution at 150° C. for 3 hours. To the resulting treated solution, a 40% aqueous sodium hydroxide solution and toluene were added, and then ethyl chloroformate was add, followed by stirring.

The supernatant toluene solution was extracted and used for measurement. Quantitative determination was carried out with a standard pyrrolidine solution. Measurements were made under the following conditions.
Equipment: Shimadzu GC-14A
Column: NB-1 (supplied by GL Sciences Inc.) 60 m×0.25 mm
Detector: FID (flame ionization detector)
Oven temperature: heating from 150° C. up to 330° C. at 10° C./min
Specimen injector temperature: 250° C.
Detector temperature: 330° C.
Carrier gas: He
Volume of specimen injected: 3.0 μl
[Molecular Weight Distribution]

A 2.5 mg portion of the polyamide resin was dissolved in 4 ml of hexafluoroisopropanol (0.005 N sodium trifluoroacetate added) and filtered through a filter of 0.45 μm, and the resulting solution was used for measurement by gel permeation chromatography (GPC). The measurement conditions were as described below.
Pump: Waters 515 (supplied by Waters)
Detector: Waters 410 differential refractometer (supplied by Waters)
Column: Shodex HFIP-806M (2 columns) and HFIP-LG
Solvent: hexafluoroisopropanol (0.005 N sodium trifluoroacetate added)
Flow rate: 0.5 ml/min
Specimen injection rate: 0.1 ml
Temperature: 30° C.
Molecular weight calibration: polymethyl methacrylate
[Tensile Characteristics]

According to ASTM D638, a Tension UTA2.5T tensile tester (supplied by Orientec Co., Ltd.) was used and tensile test at a crosshead speed of 10 mm/min was performed for an ASTM-1 dumbbell test piece with a thickness of ⅛ inch to determine the tensile strength and the tensile elongation.
[Bending Characteristics]

According to ASTM D790, a Tensilon RTA-1T bending testing machine (supplied by Orientec Co., Ltd.) was used, and bending test at a crosshead speed of 3 mm/min was performed for a rod-like test piece with a thickness of ¼ inch to determine the bending strength and the bending elastic modulus.
[Impact Characteristics]

According to ASTM D256, the Izod impact strength of a notched specimen of moldings with a thickness of ⅛ inch was measured at 23° C.
[Heat Resistance]

According to ASTM D648-82, a HDT-TESTER machine supplied by Toyo Seiki Co., Ltd. was used for a rod-like test piece with a thickness of ¼ inch to measure its deflection temperature under load at a test load of 18.6 kgf.
[LLC Resistance]

An ASTM No. 1 dumbbell specimen was immersed in a 50 wt % aqueous solution of LLC (Toyota Long Life Coolant supplied by Toyota Motor Corporation) and treated in an autoclave at 130° C. for 500 hours, followed by measuring the tensile strength retention.
[Viscoelasticity]

A test piece with a length of 55 mm and a width of 13 mm was cut out from moldings with a thickness of 3 mm, and DMS 6100 supplied by SII NanoTechnology Inc. was used in the bending mode for measurement at a frequency of 1 Hz, chuck distance of 20 mm, and heating rate of 2° C./min to heat from 20° C. to 210° C. to determine the tan δ peak top temperature which corresponds to the glass transition temperature of the impact strength modifier in the polyamide resin composition and that of the polyamide resin. Tan δ peak-top values are also shown for the glass transition temperature of polyamide resin.
[Flame Retardance]

Measurements were made at a thickness of 1/32 inch according to the method specified in UL94 (a standard established by Underwriter Laboratories Inc. in U.S.A.).

Reference Example 1

Preparation of Nylon 410 Salt

A 15.0 g portion (0.0742 mol) of sebacic acid (supplied by Tokyo Chemical Industry Co., Ltd.) was added to 150 g of ethanol, and immersed in a water bath at 60° C. to dissolve. In this, a solution prepared in advance by dissolving 6.54 g (0.0742 mol) of tetramethylene diamine (supplied by Kanto Chemical Co., Inc.) in 80 g of ethanol was dropped in 1 hour. After stirring for 3 hours, it was left to stand at room temperature to allow the resulting salt to precipitate. Subsequently, filtering and ethanol washing were carried out, followed by vacuum drying at 50° C. for 24 hours to provide nylon 410 salt.

Reference Example 2

Preparation of Nylon 46 Salt

A 15.0 g portion (0.103 mol) of adipic acid (supplied by Tokyo Chemical Industry Co., Ltd.) was added to 150 g of ethanol, and immersed in a water bath at 60° C. to dissolve. In this, a solution prepared in advance by dissolving 9.05 g (0.103 mol) of tetramethylene diamine (supplied by Kanto Chemical Co., Inc.) in 80 g of ethanol was dropped in 1 hour. After stirring for 3 hours, it was left to stand at room temperature to allow the resulting salt to precipitate. Subsequently, filtering and ethanol washing were carried out, followed by vacuum drying at 50° C. for 24 hours to provide nylon 46 salt.

Reference Example 3

Preparation of Nylon 412 Salt

A 20.0 g portion (0.0868 mol) of dodecanedioic acid (supplied by Ube Industries, Ltd.) was added to 200 ml of methanol, and immersed in a water bath at 60° C. to dissolve. In this, a solution prepared in advance by dissolving 7.66 g (0.0868 mol) of tetramethylene diamine (supplied by Kanto Chemical Co., Inc.) in 20 ml of methanol was dropped in 1 hour. After stirring for 3 hours, it was left to stand at room temperature to allow the resulting salt to precipitate. Subsequently, filtering and methanol washing were carried out, followed by vacuum drying at 50° C. for 24 hours to provide nylon 412 salt.

Reference Example 4

Preparation of Nylon 49 Salt

A 20.0 g portion (0.106 mol) of azelaic acid (Emerox 1144 supplied by Cognis) was added to 100 ml of methanol, and immersed in a water bath at 60° C. to achieve dissolution. In this, a solution prepared in advance by dissolving 9.37 g (0.106 mol) of tetramethylene diamine (supplied by Kanto Chemical Co., Inc.) in 20 ml of methanol was dropped in 1 hour. After stirring for 3 hours, it was concentrated using an evaporator to allow the salt to precipitate. Subsequently, filtering and methanol washing were carried out, followed by vacuum drying at 50° C. for 24 hours to provide nylon 49 salt.

Example 1

A 10.0 g portion of the nylon 410 salt prepared in Reference example 1 and 0.612 g of a 10 wt % aqueous tetramethylene diamine solution (equivalent to 2.02 mol % per the nylon 410 salt) were put in a test tube and left in a pressure vessel with an internal capacity of 3 L to ensure nitrogen substitution, followed by adding nitrogen to increase the internal pressure up to 6.0 kg/cm$^2$. This closed pressure vessel was then heated at a heater temperature set to 235° C. In 5 hours, the internal temperature was 191° C. and the internal pressure reached 11.2 kg/cm$^2$. Following this, the heater temperature setting was changed to 270° C., and the pressure was relieved while removing water so that the internal pressure reached zero in 2 hours. At this point, the internal temperature was 230° C. Furthermore, nitrogen flow was maintained for 2 hours, and the internal temperature increased to 254° C. Then, the pressure vessel was cooled to room temperature, and the resulting solid matter was crushed in a freezer mill to provide nylon 410.

Example 2

A 10.0 g portion of the nylon 410 salt prepared in Reference example 1 and 0.304 g of a 10 wt % aqueous tetramethylene diamine solution (equivalent to 1.00 mol % per the nylon 410 salt) were put in a test tube and left in a pressure vessel with an internal capacity of 3 L to ensure nitrogen substitution, followed by adding nitrogen to increase the internal pressure up to 6.0 kg/cm$^2$. This closed pressure vessel was then heated at a heater temperature set to 275° C. In 3 hours, the internal temperature was 211° C. and the internal pressure reached 11.1 kg/cm$^2$. Following this, the heater temperature setting was changed to 295° C., and the pressure was relieved while removing water so that the internal pressure reached zero in 1 hour and 10 minutes. At this point, the internal temperature was 258° C. Furthermore, nitrogen flow was maintained for 2 hours and 30 minutes, and the internal temperature increased to 280° C. Then, the pressure vessel was cooled to room temperature, and the resulting solid matter was crushed in a freezer mill to provide nylon 410.

Example 3

A 10.0 g portion of the nylon 410 salt prepared in Reference example 1 and 0.106 g of tetramethylene diamine (equivalent to 3.49 mol % per the nylon 410 salt) were put in a test tube and left in a pressure vessel with an internal capacity of 3 L to ensure nitrogen substitution, followed by adding nitrogen to increase the internal pressure up to 0.2 kg/cm$^2$. This closed pressure vessel was then heated at a heater temperature set to 285° C. In 1 hour and 30 minutes, the internal temperature was 165° C. and the internal pressure reached 3.0 kg/cm$^2$. By operating the relief valve, the internal pressure was maintained at 3.0 kg/cm$^2$ for 2 hours while removing water out of the system. At this point, the internal temperature had reached 242° C. Then the pressure was relieved while removing water so that the internal pressure reached zero in 5 minutes. At this point, the internal temperature was 245° C. Furthermore, nitrogen flow was maintained for 2 hours and 30 minutes, and the internal temperature increased to 275° C. Then, the pressure vessel was cooled to room temperature, and the resulting solid matter was crushed in a freezer mill to provide nylon 410.

Example 4

Except for using 10.0 g of the nylon 412 salt prepared in Reference example 3 and 0.0969 g of tetramethylene diamine (equivalent to 3.50 mol % per the nylon 412 salt), the same procedure as in Example 3 was carried out to provide nylon 412.

Example 5

Except for using 10.0 g of the nylon 49 salt prepared in Reference example 4 and 0.112 g of tetramethylene diamine (equivalent to 3.51 mol % per the nylon 49 salt), the same procedure as in Example 3 was carried out to provide nylon 49.

Comparative Example 1

A 8.00 g portion of the nylon 410 salt prepared in Reference example 1 and 0.490 g of a 10 wt % aqueous tetramethylene diamine solution (equivalent to 2.02 mol % per the nylon 410 salt) were put in a test tube and left in a pressure vessel with an internal capacity of 3 L to ensure nitrogen substitution, followed by adding nitrogen to increase the internal pressure up to 6.0 kg/cm$^2$. This closed pressure vessel was then heated at a heater temperature set to 235° C. In 6 hours, the internal temperature was 193° C. and the internal pressure reached 11.9 kg/cm$^2$. Then, the pressure vessel was cooled to room temperature, and the resulting solid matter was crushed in a freezer mill to provide a low-level nylon 410 condensate. This was subjected to solid phase polymerization under a reduced pressure (50 Pa) at 210° C. for 6 hours to provide nylon 410.

Comparative Example 2

A 16.0 g portion of an 50 wt % aqueous salt solution of nylon 410 and 0.486 g of 10 wt % aqueous tetramethylene diamine solution (equivalent to 2.00 mol % per the nylon 410 salt) were put in a test tube and left in a pressure vessel with an internal capacity of 3 L to ensure nitrogen substitution, followed by adjusting the internal nitrogen pressure to 0.2 kg/cm$^2$. This closed pressure vessel was then heated at a heater temperature set to 295° C. In 3 hour and 30 minutes, the internal pressure reached 17.5 kg/cm$^2$ and the internal temperature reached 239° C. By operating the relief valve, the internal pressure was maintained at 17.5 kg/cm$^2$ for 1 hour and 30 minutes while removing water out of the system. At this point, the internal temperature had reached 243° C. Then, while removing water, the internal pressure was lowered to zero in 1 hour and 20 minutes. At this point, the internal temperature was 265° C. Furthermore, nitrogen flow was maintained for 2 hours, and the internal temperature increased to 280° C. Then, the pressure vessel was cooled to room temperature, and the resulting solid matter was crushed in a freezer mill to provide nylon 410.

Comparative Example 3

A 3.69 g (0.0419 mol) portion of tetramethylene diamine and 3.35 g (0.0838 mol) of sodium hydroxide were dissolved in 100 ml of ion-exchanged water to prepare a water phase. Elsewhere, 10.0 g (0.0418 mol) of sebacoyl chloride was dissolved in 100 ml of toluene to prepare an organic phase. At room temperature, while the water phase is being stirred, the organic phase was dropped over 1 hour, followed by stirring for 2 hours. Filtering and methanol washing were carried out to provide nylon 410.

Comparative Example 4

A 8.00 g portion of the nylon 46 salt prepared in Reference example 2 and 0.602 g of a 10 wt % aqueous tetramethylene diamine solution (equivalent to 2.00 mol % per the nylon 410 salt) were put in a test tube and left in a pressure vessel with an internal capacity of 3 L to ensure nitrogen substitution, followed by adding nitrogen to increase the internal pressure up to 6.0 kg/cm$^2$. This closed pressure vessel was then heated at a heater temperature set to 245° C. In 6 hours, the internal temperature was 204° C. and the internal pressure reached 13.1 kg/cm$^2$. Then, the pressure vessel was cooled to room temperature, and the resulting solid matter was crushed in a freezer mill to provide a low-level nylon 46 condensate. This was subjected to solid phase polymerization under a reduced pressure (50 Pa) at 260° C. for 3 hours to provide nylon 46.

Comparative Example 5

The low-level nylon 46 condensate prepared in Comparative example 4 was subjected to melt polymerization under a reduced pressure (50 Pa) at 305° C. for 1 hour to provide nylon 46.

TABLE 1

|  |  | Example 1 | Example 2 | Example 3 | Example 4 | Example 5 |
|---|---|---|---|---|---|---|
| Polyamide | — | nylon 410 | nylon 410 | nylon 410 | nylon 412 | nylon 49 |
| Excess diamine | mol/1,000 mol salt | 20.2 | 10.0 | 34.9 | 35.0 | 35.1 |
| Content of Water | wt % | 5.2 | 2.7 | 0 | 0 | 0 |
| Single- or two-step polymerization | — | single-step polymerization | single-step polymerization | single-step polymerization | single-step polymerization | single-step polymerization |
| Internal pressure at start of polymerization | kg/cm$^2$ | 6.0 | 6.0 | 0.2 | 0.2 | 0.2 |
| Time to reach maximum pressure | min | 300 | 180 | 90 | 90 | 90 |
| Temperature of the point at which maximum pressure is reached | ° C. | 191 | 211 | 165 | 165 | 165 |
| Maximum pressure | kg/cm$^2$ | 11.2 | 11.1 | 3.0 | 3.0 | 3.0 |
| Time controlled under maximum pressure | min | 0 | 0 | 120 | 120 | 120 |
| Temperature at start of pressure relief | ° C. | 191 | 211 | 242 | 242 | 242 |
| Time required for pressure to relieve | min | 120 | 70 | 5 | 5 | 5 |
| Temperature at end of pressure relief | ° C. | 230 | 258 | 245 | 245 | 245 |
| Method for high-degree polymerization after pressure relief | — | N$_2$ flow × 2 hr | N$_2$ flow × 2.5 hr | N$_2$ flow × 2.5 hr | N$_2$ flow × 2.5 hr | N$_2$ flow × 2.5 hr |
| Maximum temperature | ° C. | 254 | 280 | 275 | 275 | 275 |
| Total polymerization time | min | 540 | 400 | 365 | 365 | 365 |
| ηr of low-level condensate | — | — | — | — | — | — |
| Method for high-degree polymerization in two-step polymerization | — | — | — | — | — | — |
| Conditions for solid phase polymerization | — | — | — | — | — | — |
| Conditions for melt polymerization | — | — | — | — | — | — |
| ηr after high-degree polymerization (A) | — | 3.49 | 2.67 | 2.68 | 2.75 | 2.53 |
| [NH$_2$] | ×10$^{-5}$ mol/g | 4.12 | 3.29 | 5.01 | 4.13 | 4.86 |
| [COOH] | ×10$^{-5}$ mol/g | 1.95 | 5.14 | 5.60 | 5.14 | 6.59 |
| [Pyrrolidine] | ×10$^{-5}$ mol/g | 2.69 | 3.74 | 2.09 | 0.86 | 2.45 |
| Color | — | white | white | white | white | white |
| Tm (° C.) | ° C. | 249 | 249 | 249 | 241 | 240 |
| Relative viscosity after melt retention (B) | — | 3.56 | 2.79 | 2.76 | 2.88 | 2.58 |
| B/A | — | 1.02 | 1.04 | 1.03 | 1.05 | 1.02 |

TABLE 2

|  |  | Comparative example 1 | Comparative example 2 | Comparative example 3 | Comparative example 4 | Comparative example 5 |
|---|---|---|---|---|---|---|
| Polyamide | — | nylon 410 | nylon 410 | nylon 410 | nylon 46 | nylon 46 |
| Excess diamine | mol/1,000 mol salt | 20.2 | 20.0 | — | 20.0 | 20.0 |
| Content of Water | wt % | 5.2 | 51 | — | 6.3 | 6.3 |
| Single- or two-step polymerization | — | two-step polymerization | single-step polymerization | single-step polymerization (interfacial polycondensation) | two-step polymerization | two-step polymerization |
| Internal pressure at start of polymerization | kg/cm$^2$ | 6.0 | 6.0 | — | 6.0 | 6.0 |
| Time to reach maximum pressure | min | 360 | 210 | — | 360 | 360 |
| Temperature of the point at which maximum pressure is reached | ° C. | 193 | 239 | — | 204 | 204 |
| Maximum pressure | kg/cm$^2$ | 11.9 | 17.5 | — | 13.1 | 13.1 |
| Time controlled under maximum pressure | min | — | 90 | — | — | — |
| Temperature at start of pressure relief | ° C. | — | 243 | — | — | — |
| Time required for pressure to relieve | min | — | 80 | — | — | — |
| Temperature at end of pressure relief | ° C. | — | 265 | — | — | — |
| Method for high-degree polymerization after pressure relief | — | — | N$_2$ flow × 2 hr | — | — | — |

TABLE 2-continued

|  |  | Comparative example 1 | Comparative example 2 | Comparative example 3 | Comparative example 4 | Comparative example 5 |
|---|---|---|---|---|---|---|
| Maximum temperature | ° C. | 193 | 280 | — | 204 | 204 |
| Total polymerization time | min | 360 | 500 | — | 360 | 360 |
| ηr of low-level condensate | — | — | 1.56 | — | — | 1.51 | 1.51 |
| Method for high-degree polymerization in two-step polymerization | — | — | solid phase polymerization | — | — | solid phase polymerization | melt polymerization |
| Conditions for solid phase polymerization | — | — | 210° C. × 6 hr | — | — | 260° C. × 3 hr | — |
| Conditions for melt polymerization | — | — | — | — | — | — | 305° C. × 1 hr |
| ηr after high-degree polymerization (A) | — | 3.06 | 1.26 | 1.52 | 3.59 | 3.12 |
| [NH$_2$] | ×10$^{-5}$ mol/g | — | 0.18 | 5.2 | — | 2.05 |
| [COOH] | ×10$^{-5}$ mol/g | — | 49.3 | 32.1 | — | 6.39 |
| [Pyrrolidine] | ×10$^{-5}$ mol/g | 2.29 | 14.9 | 0 | 2.52 | 3.76 |
| Color | — | white | white | white | white | yellow |
| Tm (° C.) | ° C. | 247 | 238 | 245 | 290 | 290 |
| Relative viscosity after melt retention (B) | — | 3.21 | 1.24 | 1.55 | 2.44 | 2.05 |
| B/A | — | 1.05 | 0.98 | 1.02 | 0.68 | 0.66 |

Comparison between Examples 1 to 3 and Comparative example 1 suggests that nylon 410 can be polymerized up to a high degree of polymerization not only through two-step polymerization (oligomer preparation followed by solid phase polymerization) but also through single-step polymerization. This nylon 410 specimen has a excellent melt retention stability, suffering no significant decrease in the degree of polymerization during melt retention.

It is seen from Comparative example 2 that the degree of polymerization is low when the starting material has a 50 wt % water content at a temperature of or above 201° C.

It is seen from Comparative example 3 that the degree of polymerization is low in the case of a nylon 410 specimen produced through interfacial polycondensation. This is probably due to highly hydrophilic tetramethylene diamine and its low rate of flow into the organic phase in the interfacial polycondensation.

It is seen from Comparative example 4 that a white nylon 46 product with a high degree of polymerization is produced by solid phase polymerization of a low-level nylon 410 condensate which is obtained by heating a nylon 46 salt in a closed system, but it is inferior in terms of melt retention stability.

It is seen from Comparative example 5 that a nylon 46 with a high degree of polymerization is produced through melt polymerization of a low-level condensate obtained by heating in a closed system, under reduced pressure, but it is has a yellowish color and is inferior in terms of melt retention stability.

Example 6

A 700 g portion of the nylon 410 salt prepared in Reference example 1 and 2.12 g of tetramethylene diamine (equivalent to 1.00 mol % per the nylon 410 salt) were left in a pressure vessel with an internal capacity of 3 L equipped with a stirrer to ensure nitrogen substitution, followed by adding nitrogen to increase the internal pressure up to 5.0 kg/cm$^2$. This closed pressure vessel was then heated at a heater temperature set to 230° C. In 3 hours, the internal temperature was 224° C. and the internal pressure reached 18.3 kg/cm$^2$. Following this, the heater temperature setting was changed to 260° C., and the pressure was relieved while removing water so that the internal pressure reached zero in 70 minutes. At this point, the internal temperature was 255° C. The heater temperature setting was changed to 270° C., and nitrogen flow was maintained for 4 hours, allowing the internal temperature to increase to 269° C. The material in the pressure vessel was taken out in the form of a string from the discharge port at the bottom, which was cut to provide nylon 410 pellets.

Example 7

A 700 g portion of the nylon 410 salt prepared in Reference example 1 and 2.12 g of tetramethylene diamine (equivalent to 1.00 mol % per the nylon 410 salt) were left in a pressure vessel with an internal capacity of 3 L equipped with a stirrer to ensure nitrogen substitution, followed by adding nitrogen to increase the internal pressure up to 5.0 kg/cm$^2$. This closed pressure vessel was then heated at a heater temperature set to 240° C. In 2 hours, the internal temperature was 227° C. and the internal pressure reached 17.3 kg/cm$^2$. Following this, the heater temperature setting was changed to 280° C., and the pressure was relieved while removing water so that the internal pressure reached zero in 80 minutes. At this point, the internal temperature was 274° C. Furthermore, a reduced pressure of −160 mmHg was maintained for 90 minutes, allowing the internal temperature to increase to 279° C. The material in the pressure vessel was taken out in the form of a string from the discharge port at the bottom, which was cut to provide nylon 410 pellets.

Example 8

A 700 g portion of the nylon 410 salt prepared in Reference example 1, 2.12 g of tetramethylene diamine (equivalent to 1.00 mol % per the nylon 410 salt), and 0.3065 g of sodium hypophosphite monohydrate were left in a pressure vessel with an internal capacity of 3 L equipped with a stirrer to ensure nitrogen substitution, followed by adding nitrogen to increase the internal pressure up to 5.0 kg/cm$^2$. This closed pressure vessel was then heated at a heater temperature set to 230° C. In 3 hours, the internal temperature was 223° C. and the internal pressure reached 19.1 kg/cm$^2$. Following this, the heater temperature setting was changed to 260° C., and the pressure was relieved while removing water so that the internal pressure reached zero in 70 minutes. At this point, the internal temperature was 254° C. The heater temperature setting was changed to 270° C., and nitrogen flow was maintained for 4 hours, allowing the internal temperature to increase to 269° C. The material in the pressure vessel was taken out in the form of a string from the discharge port at the bottom, which was cut to provide nylon 410 pellets.

Example 9

A 700 g portion of the nylon 410 salt prepared in Reference example 1, 2.12 g of tetramethylene diamine (equivalent to 1.00 mol % per the nylon 410 salt), and 0.3065 g of sodium hypophosphite monohydrate were left in a pressure vessel with an internal capacity of 3 L equipped with a stirrer to ensure nitrogen substitution, followed by adding nitrogen to increase the internal pressure up to 5.0 kg/cm$^2$. This closed pressure vessel was then heated at a heater temperature set to 250° C. In 3 hours and 30 minutes, the internal temperature was 239° C. and the internal pressure reached 21.7 kg/cm$^2$. Following this, the heater temperature setting was changed to 260° C., and the pressure was relieved while removing water so that the internal pressure reached zero in 80 minutes. At this point, the internal temperature was 256° C. The heater temperature setting was changed to 270° C., and nitrogen flow was maintained for 2 hours and 30 minutes, allowing the internal temperature to increase to 269° C. The material in the pressure vessel was taken out in the form of a string from the discharge port at the bottom, which was cut to provide nylon 410 pellets.

Example 10

A 700 g portion of the nylon 410 salt prepared in Reference example 1, 2.12 g of tetramethylene diamine (equivalent to 1.00 mol % per the nylon 410 salt), and 0.3065 g of sodium hypophosphite monohydrate were left in a pressure vessel with an internal capacity of 3 L equipped with a stirrer to ensure nitrogen substitution, followed by adding nitrogen to increase the internal pressure up to 0.5 kg/cm$^2$. This closed pressure vessel was then heated at a heater temperature set to 250° C. In 2 hours and 30 minutes, the internal temperature was 232° C. and the internal pressure reached 14.7 kg/cm$^2$. Following this, the heater temperature setting was changed to 260° C., and the pressure was relieved while removing water so that the internal pressure reached zero in 40 minutes. At this point, the internal temperature was 255° C. The heater temperature setting was changed to 270° C., and nitrogen flow was maintained for 2 hours, allowing the internal temperature to increase to 269° C. The material in the pressure vessel was taken out in the form of a string from the discharge port at the bottom, which was cut to provide nylon 410 pellets.

Example 11

A 700 g portion of the nylon 410 salt prepared in Reference example 1, 2.12 g of tetramethylene diamine (equivalent to 1.00 mol % per the nylon 410 salt), and 0.3065 g of sodium hypophosphite monohydrate were left in a pressure vessel with an internal capacity of 3 L equipped with a stirrer to ensure nitrogen substitution, followed by adding nitrogen to increase the internal pressure up to 0.5 leg/cm$^2$. This closed pressure vessel was then heated at a heater temperature set to 250° C. In 1 hour and 36 minutes, the internal temperature was 223° C. and the internal pressure reached 10.0 kg/cm$^2$. By operating the relief valve, the internal pressure was maintained at 10.0 kg/cm$^2$ for 54 minutes while removing water out of the system. At this point, the internal temperature had reached 233° C. Following this, the heater temperature setting was changed to 260° C., and the pressure was relieved while removing water so that the internal pressure reached zero in 40 minutes. At this point, the internal temperature was 256° C. The heater temperature setting was changed to 270° C., and nitrogen flow was maintained for 1 hour and 30 minutes, allowing the internal temperature to increase to 266° C. The material in the pressure vessel was taken out in the form of a string from the discharge port at the bottom, which was cut to provide nylon 410 pellets.

Example 12

A 700 g portion of the nylon 410 salt prepared in Reference example 1, 2.12 g of tetramethylene diamine (equivalent to 1.00 mol % per the nylon 410 salt), and 0.3065 g of sodium hypophosphite monohydrate were left in a pressure vessel with an internal capacity of 3 L equipped with a stirrer to ensure nitrogen substitution, followed by adding nitrogen to increase the internal pressure up to 0.5 kg/cm$^2$. This closed pressure vessel was then heated at a heater temperature set to 260° C. In 1 hour and 2 minutes, the internal temperature was 214° C. and the internal pressure reached 5.0 kg/cm$^2$. By operating the relief valve, the internal pressure was maintained at 5.0 kg/cm$^2$ for 88 minutes while removing water out of the system. At this point, the internal temperature had reached 248° C. Following this, the heater temperature setting was changed to 270° C., and the pressure was relieved while removing water so that the internal pressure reached zero in 10 minutes. At this point, the internal temperature was 253° C. Furthermore, nitrogen flow was maintained for 1 hour and 30 minutes, allowing the internal temperature to increase to 267° C. The material in the pressure vessel was taken out in the form of a string from the discharge port at the bottom, which was cut to provide nylon 410 pellets.

Example 13

A 700 g portion of the nylon 410 salt prepared in Reference example 1, 2.12 g of tetramethylene diamine (equivalent to 1.00 mol % per the nylon 410 salt), 0.3065 g of sodium hypophosphite monohydrate, and 467 g of ion-exchanged water were left in a pressure vessel with an internal capacity of 3 L equipped with a stirrer to ensure nitrogen substitution, followed by adding nitrogen to increase the internal pressure up to 0.5 kg/cm$^2$. This closed pressure vessel was then heated at a heater temperature set to 170° C. In 45 minutes, the internal temperature was 140° C. and the internal pressure reached 2.0 kg/cm$^2$. By operating the relief valve, the internal pressure was maintained at 2.0 kg/cm$^2$ for 1 hour and 45 minutes while removing water out of the system. At this point, the internal temperature had reached 173° C. Following this, the heater temperature setting was changed to 260° C., and the relief valve was closed temporally (at this point, 367 g of water had been removed). In 5 minutes, the internal pressure was 3.0 kg/cm$^2$ and the internal temperature reached 177° C. By operating the relief valve, the internal pressure was maintained at 3.0 kg/cm$^2$ for 1 hour and 20 minutes while removing water out of the system. At this point, the internal temperature had reached 249° C. Following this, the heater temperature setting was changed to 270° C., and the pressure was relieved while removing water so that the internal pressure reached zero in 10 minutes. At this point, the internal temperature was 257° C. Furthermore, nitrogen flow was maintained for 2 hour and 15 minutes, allowing the internal temperature to increase to 268° C. The material in the pressure vessel was taken out in the form of a string from the discharge port at the bottom, which was cut to provide nylon 410 pellets.

Example 14

A 700 g portion of the nylon 410 salt prepared in Reference example 1, 2.12 g of tetramethylene diamine (equivalent to 1.00 mol % per the nylon 410 salt), and 0.3065 g of sodium hypophosphite monohydrate were left in a pressure vessel with an internal capacity of 3 L equipped with a stirrer to ensure nitrogen substitution, followed by adding nitrogen to increase the internal pressure up to 10.0 kg/cm². This closed pressure vessel was then heated at a heater temperature set to 250° C. In 3 hours and 20 minutes, the internal temperature was 235° C. and the internal pressure reached 25.5 kg/cm². Following this, the heater temperature setting was changed to 260° C., and the pressure was relieved while removing water so that the internal pressure reached zero in 90 minutes. At this point, the internal temperature was 255° C. The heater temperature setting was changed to 270° C., and nitrogen flow was maintained for 2 hours and 30 minutes, allowing the internal temperature to increase to 266° C. The material in the pressure vessel was taken out in the form of a string from the discharge port at the bottom, which was cut to provide nylon 410 pellets.

Example 15

A 700 g portion of the nylon 410 salt prepared in Reference example 1, 8.50 g of tetramethylene diamine (equivalent to 4.00 mol % per the nylon 410 salt), 0.3065 g of sodium hypophosphite monohydrate, and 700 g of ion-exchanged water were left in a pressure vessel with an internal capacity of 3 L equipped with a stirrer to ensure nitrogen substitution, followed by adding nitrogen to increase the internal pressure up to 0.5 kg/cm². This closed pressure vessel was then heated at a heater temperature set to 270° C. In 27 minutes, the internal temperature was 118° C. and the internal pressure reached 3.0 kg/cm². By operating the relief valve, the internal pressure was maintained at 3.0 kg/cm² for 1 hour and 43 minutes while removing water out of the system (617 g of water had been removed when the temperature reached 200° C.). At this point, the internal temperature had reached 250° C. The pressure was relieved while removing water so that the internal pressure reached zero in 5 minutes. At this point, the internal temperature was 254° C. Nitrogen flow was maintained for 2 hours, allowing the internal temperature to increase to 270° C. The material in the pressure vessel was taken out in the form of a string from the discharge port at the bottom, which was cut to provide nylon 410 pellets.

Example 16

A 700 g portion of the nylon 410 salt prepared in Reference example 1, 9.56 g of tetramethylene diamine (equivalent to 4.50 mol % per the nylon 410 salt), 0.3065 g of sodium hypophosphite monohydrate, and 700 g of ion-exchanged water were left in a pressure vessel with an internal capacity of 3 L equipped with a stirrer to ensure nitrogen substitution, followed by adding nitrogen to increase the internal pressure up to 0.5 kg/cm². This closed pressure vessel was then heated at a heater temperature set to 270° C. In 28 minutes, the internal temperature was 116° C. and the internal pressure reached 3.0 kg/cm². By operating the relief valve, the internal pressure was maintained at 3.0 kg/cm² for 1 hour and 42 minutes while removing water out of the system (662 g of water had been removed when the temperature reached 200° C.). At this point, the internal temperature had reached 245° C. The pressure was relieved while removing water so that the internal pressure reached zero in 5 minutes. At this point, the internal temperature was 251° C. Nitrogen flow was maintained for 2 hours, allowing the internal temperature to increase to 270° C. The material in the pressure vessel was taken out in the form of a string from the discharge port at the bottom, which was cut to provide nylon 410 pellets.

Example 17

A 700 g portion of the nylon 410 salt prepared in Reference example 1, 10.6 g of tetramethylene diamine (equivalent to 5.00 mol % per the nylon 410 salt), 0.3065 g of sodium hypophosphite monohydrate, and 700 g of ion-exchanged water were left in a pressure vessel with an internal capacity of 3 L equipped with a stirrer to ensure nitrogen substitution, followed by adding nitrogen to increase the internal pressure up to 0.5 kg/cm². This closed pressure vessel was then heated at a heater temperature set to 270° C. In 28 minutes, the internal temperature was 117° C. and the internal pressure reached 3.0 kg/cm². By operating the relief valve, the internal pressure was maintained at 3.0 kg/cm² for 1 hour and 42 minutes while removing water out of the system (645 g of water had been removed when the temperature reached 200° C.). At this point, the internal temperature had reached 249° C. The pressure was relieved while removing water so that the internal pressure reached zero in 5 minutes. At this point, the internal temperature was 253° C. Nitrogen flow was maintained for 2 hours, allowing the internal temperature to increase to 270° C. The material in the pressure vessel was taken out in the form of a string from the discharge port at the bottom, which was cut to provide nylon 410 pellets.

Comparative Example 6

A 700 g portion of the nylon 410 salt prepared in Reference example 1, 2.12 g of tetramethylene diamine (equivalent to 1.00 mol % per the nylon 410 salt), and 0.3065 g of sodium hypophosphite monohydrate were left in a pressure vessel with an internal capacity of 3 L equipped with a stirrer to ensure nitrogen substitution, followed by supplying nitrogen to flow in the pressure vessel under atmospheric pressure at a rate of 0.5 L/min. While maintaining the nitrogen flow, the heater temperature was set to 260° C. to start heating. The internal temperature reached 208° C. in 1 hour, and the internal temperature reached 256° C. in 2 hours. Following this, the heater temperature setting was changed to 270° C., which was maintained for 2 hours and 30 minutes, allowing the internal temperature to increase to 265° C. The material in the pressure vessel was taken out in the form of a string from the discharge port at the bottom, which was cut to provide nylon 410 pellets.

Comparative Example 7

A 700 g portion of the nylon 410 salt prepared in Reference example 1, 2.12 g of tetramethylene diamine (equivalent to 1.00 mol % per the nylon 410 salt), 0.3065 g of sodium hypophosphite monohydrate, and 467 g of ion-exchanged water were left in a pressure vessel with an internal capacity of 3 L equipped with a stirrer to ensure nitrogen substitution, followed by adding nitrogen to increase the internal pressure up to 0.5 kg/cm². This closed pressure vessel was then heated at a heater temperature set to 290° C. In 55 minutes, the internal temperature was 217° C. and the internal pressure reached 17.5 kg/cm². The heater temperature was changed to 270° C. and, by operating the relief valve, the internal pressure was maintained at 17.5 kg/cm² for 75 minutes while removing water out of the system. At this point, the internal temperature had reached 240° C. Following this, the internal pressure was relieved so that it reached zero in 1 hour. At this point, the internal temperature was 261° C. Furthermore, nitrogen flow was maintained for 2 hours and 30 minutes, allowing the internal temperature to increase to 265° C. The material in the pressure vessel was taken out from the discharge port at the bottom to provide a nylon 410 sample (too low in melt viscosity to form a string).

Comparative Example 8

A 700 g portion of a nylon 66 salt, g of hexamethylene diamine (equivalent to 1.00 mol % per the nylon 66 salt), and 467 g of ion-exchanged water were left in a pressure vessel with an internal capacity of 3 L equipped with a stirrer to ensure nitrogen substitution, followed by adding nitrogen to increase the internal pressure up to 0.5 kg/cm². This closed pressure vessel was then heated at a heater temperature set to 295° C. In 50 minutes, the internal temperature was 223° C. and the internal pressure reached 17.5 kg/cm². The heater temperature was changed to 280° C. and, by operating the relief valve, the internal pressure was maintained at 17.5 kg/cm² for 1 hour while removing water out of the system. At this point, the internal temperature had reached 250° C. Following this, the internal pressure was relieved so that it reached zero in 1 hour. At this point, the internal temperature was 276° C. Furthermore, nitrogen flow was maintained for 10 minutes, allowing the internal temperature to increase to 278° C. The material in the pressure vessel was taken out in the form of a string from the discharge port at the bottom, which was cut to provide nylon 66 pellets.

Comparative Example 9

A 700 g portion of the nylon 410 salt prepared in Reference example 1, 4.25 g of tetramethylene diamine (equivalent to 2.00 mol % per the nylon 410 salt), 0.3065 g of sodium hypophosphite monohydrate, and 70 g of ion-exchanged water were left in a pressure vessel with an internal capacity of 3 L equipped with a stirrer, which was closed airtightly to ensure nitrogen substitution, followed by adding nitrogen to increase the internal pressure up to 0.5 kg/cm². This closed pressure vessel was then heated at a heater temperature set to 260° C. In 100 minutes, the internal temperature was 223° C. and the internal pressure reached 15.0 kg/cm². By operating the relief valve, the internal pressure was maintained at 15.0 kg/cm² for 30 minutes while removing water out of the system. At this point, the internal temperature had reached 241° C. Subsequently, the material in the reaction vessel was discharged onto a cooling belt. It was vacuum-dried at 80° C. for 24 hours, and it was polymerized in solid state at 220° C. and 100 Pa to provide a nylon 410 sample ($\eta r=3.06$).

TABLE 3

|  |  | Example 6 | Example 7 | Example 8 | Example 9 | Example 10 | Example 11 | Example 12 | Example 13 |
|---|---|---|---|---|---|---|---|---|---|
| Excess diamine | mol/1,000 mol salt | 10 | 10 | 10 | 10 | 10 | 10 | 10 | 10 |
| Content of Water | wt % | 0 | 0 | 0 | 0 | 0 | 0 | 0 | 40 |
| Internal pressure at start of polymerization | kg/cm² | 5 | 5 | 5 | 5 | 0.5 | 0.5 | 0.5 | 0.5 |
| Time to reach maximum pressure | min | 180 | 120 | 180 | 210 | 150 | 96 | 62 | 155 |
| Temperature of the point at which maximum pressure is reached | ° C. | 224 | 227 | 223 | 239 | 232 | 223 | 214 | 177 |
| Maximum pressure | kg/cm² | 18.3 | 17.3 | 19.1 | 21.7 | 14.7 | 10.0 | 5.0 | 3.0 |
| Time controlled under maximum pressure | min | 0 | 0 | 0 | 0 | 0 | 54 | 88 | 80 |
| Temperature at start of pressure relief | ° C. | 224 | 227 | 223 | 239 | 232 | 233 | 214 | 249 |
| Time required for pressure to relieve | min | 70 | 80 | 70 | 80 | 40 | 40 | 10 | 10 |
| Temperature at end of pressure relief | ° C. | 255 | 274 | 254 | 256 | 255 | 256 | 253 | 257 |
| Method for high-degree polymerization after pressure relief | — | $N_2$ flow × 4 hr | −160 mmHg × 1.5 hr | $N_2$ flow × 4 hr | $N_2$ flow × 2.5 hr | $N_2$ flow × 2 hr | $N_2$ flow × 1.5 hr | $N_2$ flow × 1.5 hr | $N_2$ flow × 2.25 hr |
| Maximum temperature | ° C. | 269 | 279 | 269 | 269 | 269 | 266 | 267 | 268 |
| Total polymerization, time | min | 490 | 290 | 490 | 440 | 310 | 280 | 250 | 380 |
| $\eta r$ (A) | — | 2.83 | 2.38 | 3.22 | 2.87 | 3.00 | 2.74 | 2.63 | 3.18 |
| [NH$_2$] | ×10⁻⁵ mol/g | 3.75 | 4.65 | 2.71 | 2.41 | 3.91 | 4.83 | 6.70 | 1.50 |
| [COOH] | ×10⁻⁵ mol/g | 3.09 | 5.14 | 2.70 | 3.37 | 3.34 | 4.60 | 4.15 | 7.04 |
| [Pyrrolidine] | ×10⁻⁵ mol/g | 4.92 | 5.15 | 4.94 | 6.29 | 3.44 | 2.99 | 2.21 | 0.61 |
| Color | — | white | white | white | white | white | white | white | white |
| Tm (° C.) | ° C. | 249 | 249 | 250 | 249 | 249 | 250 | 250 | 250 |
| Relative viscosity after melt retention (B) | — | 2.88 | 2.48 | 3.27 | 2.95 | 3.08 | 2.79 | 2.74 | 3.17 |
| B/A | — | 1.02 | 1.04 | 1.02 | 1.03 | 1.03 | 1.02 | 1.04 | 1.00 |

TABLE 4

|  |  | Example 14 | Example 15 | Example 16 | Example 17 | Comparative example 6 | Comparative example 7 | Comparative example 8 | Comparative example 9 |
|---|---|---|---|---|---|---|---|---|---|
| Excess diamine | mol/1,000 mol salt | 10 | 40 | 45 | 50 | 10 | 10 | 10 | — |
| Content of Water | wt % | 0 | 50 | 50 | 50 | 0 | 40 | 40 | — |
| Internal pressure at start of polymerization | kg/cm$^2$ | 10 | 0.5 | 0.5 | 0.5 | 0 | 0.5 | 0.5 | — |
| Time to reach maximum pressure | min | 200 | 27 | 28 | 28 | — | 55 | 50 | — |
| Temperature of the point at which maximum pressure is reached | °C. | 235 | 118 | 116 | 117 | — | 217 | 223 | — |
| Maximum pressure | kg/cm$^2$ | 25.5 | 3.0 | 3.0 | 3.0 | 0 | 17.5 | 17.5 | — |
| Time controlled under maximum pressure | min | 0 | 103 | 102 | 102 | — | 75 | 70 | — |
| Temperature at start of pressure relief | °C. | 235 | 250 | 245 | 249 | — | 240 | 250 | — |
| Time required for pressure to relieve | min | 90 | 5 | 5 | 5 | — | 60 | 60 | — |
| Temperature at end of pressure relief | °C. | 255 | 254 | 251 | 253 | — | 261 | 276 | — |
| Method for high-degree polymerization after pressure relief | — | N$_2$ flow × 2.5 hr | N$_2$ flow × 2 hr | N$_2$ flow × 2 hr | N$_2$ flow × 2 hr | — | N$_2$ flow × 2.5 hr | N$_2$ flow × 10 min | — |
| Maximum temperature | °C. | 266 | 270 | 270 | 270 | 265 | 265 | 278 | — |
| Total polymerization time | min | 440 | 255 | 255 | 255 | 270 | 340 | 190 | — |
| ηr (A) | — | 2.48 | 2.88 | 3.19 | 3.07 | 1.60 | 1.32 | 2.78 | 3.06 |
| [NH$_2$] | ×10$^{-5}$ mol/g | 1.67 | 2.13 | 2.73 | 5.14 | 0.121 | 0.21 | 7.31 | — |
| [COOH] | ×10$^{-5}$ mol/g | 3.90 | 7.92 | 5.62 | 4.10 | 36.6 | 41.3 | 4.18 | — |
| [Pyrrolidine] | ×10$^{-5}$ mol/g | 8.83 | 1.16 | 1.06 | 1.05 | 0.30 | 15.3 | — | 2.29 |
| Color | — | white | white | white | white | white | white | white | white |
| Tm (°C.) | °C. | 248 | 250 | 250 | 250 | 245 | 238 | 264 | 290 |
| Relative viscosity after melt retention (B) | — | 2.49 | 2.94 | 3.25 | 3.19 | 1.49 | 1.25 | 2.72 | 2.11 |
| B/A | — | 1.00 | 1.02 | 1.02 | 1.04 | 0.93 | 0.95 | 0.98 | 0.69 |

It is seen from Examples 6 to 17 that a polymerization vessel equipped with a stirrer can serve to perform single-step melt polymerization to produce nylon 410 with a high degree of polymerization. Furthermore, a lower maximum pressure tends to lead to a smaller pyrrolidine content.

It is seen from Examples 13 and 15 to 17 and Comparative example 7 that reducing the water content in the starting material to below 30 wt % below 201°C. serves to produce nylon 410 with a high degree of polymerization.

Comparison between Comparative example 7 and Comparative example 8 suggests that nylon 66 can be polymerized up to a high degree of polymerization through single-step melt polymerization even when the water content in the starting material is higher than 30 wt %.

Example 18 and Comparative Examples 10 to 13

As shown in Table 6, test pieces of a variety of polyamide resin samples were produced by injection molding (SG75H-MIV, supplied by Sumitomo Heavy Industries, Ltd., set to a cylinder temperature of 25°C. higher than the melting point, mold temperature of 80°C., injection pressure of 5 kg/cm$^2$ higher than lower limit pressure) and their mechanical properties were evaluated. Results are given in Table 6.

The polyamide resin samples used are as described below.

Nylon 410 (produced by melting polymerization): Example 17

Nylon 410 (produced by solid phase polymerization): Comparative example 9

Nylon 6: CM1017 (supplied by Toray Industries, Inc.), ηr=2.65, melting point=222°C.

TABLE 5

|  | Example 1 | Example 11 | Example 12 | Example 13 | Example 17 | Comparative example 1 | Comparative example 4 |
|---|---|---|---|---|---|---|---|
| Weight average molecular weight | 51,200 | 40,500 | 47,900 | 41,400 | 35,900 | 50,300 | 97,500 |
| Number average molecular weight | 23,300 | 18,600 | 20,300 | 18,400 | 17,700 | 16,900 | 35,200 |
| Peak-top molecular weight | 41,500 | 32,400 | 31,600 | 38,800 | 36,000 | 37,500 | 62,700 |
| Mw/Mn | 2.20 | 2.18 | 2.36 | 2.25 | 2.03 | 2.98 | 2.77 |

The nylon 410 samples produced through the single-step melt polymerization process according to the invention have narrower molecular weight distributions than the nylon 410 and 46 samples produced through the two-step polymerization process.

Nylon 66: CM3001N (supplied by Toray Industries, Inc.), ηr=2.95, melting point=263°C.

Nylon 610: CM2001 (supplied by Toray Industries, Inc.), ηr=2.70, melting point=225°C.

TABLE 6

| | | Example 18 | Comparative example 10 | Comparative example 11 | Comparative example 12 | Comparative example 13 |
|---|---|---|---|---|---|---|
| Polyamide resin | nylon 410 (melt polymerization) | 100 | | | | |
| | nylon 410 (solid phase polymerization) | | 100 | | | |
| | nylon 66 | | | 100 | | |
| | nylon 6 | | | | 100 | |
| | nylon 610 | | | | | 100 |
| Tensile characteristics | strength (MPa) | 76 | 74 | 82 | 78 | 55 |
| | elongation (%) | >200 | 47 | 30 | >200 | >200 |
| Bending characteristics | strength (MPa) | 112 | 110 | 111 | 111 | 83 |
| | elastic modulus (GPa) | 2.78 | 2.75 | 2.83 | 2.72 | 2.04 |
| DTUL | (° C.) at 1.82 MPa(highload) | 80 | 78 | 81 | 61 | 57 |
| Water absorption characteristics | saturated water absorption (%) | 4.5 | 4.6 | 6.7 | 8.0 | 3.0 |

Example 19 and Comparative Examples 14 to 17

Polyamide resin and glass fiber were fed through the main feeder (upstream-side supply port) and the side feeder (downstream-side supply port), respectively, of a twin screw extruder (TEX30, supplied by The Japan Steel Works, Ltd.) according to the compositions given in Table 7, and melt-kneaded. The melt-kneading temperature was set to 20° C. above the melting point, and the screw rotation speed was set to 250 rpm. A string was extruded, pelletized, and vacuum-dried at 80° C. for 24 hours. The pellets were injection-molded (SG75H-MIV, supplied by Sumitomo Heavy Industries, Ltd., set to a cylinder temperature of 25° C. higher than the melting point, mold temperature of 80° C., injection pressure of 5 kg/cm² higher than lower limit pressure) to provide various test pieces, and their mechanical properties were evaluated. Results are given in Table 7.

Polyamide resin samples as given in Table 6 were used as starting material along with T289 glass fiber supplied by Nippon Electric Glass Co., Ltd.

Example 20 and Comparative Examples 18 to 21

Polyamide resin samples and an impact strength modifier were combined to prepare preblends according to the compositions given in Table 8. They were melt-kneaded after being fed to a twin screw extruder (PCM-30, supplied by Ikegai Tekko Co., Ltd.) set to a cylinder temperature of 20° C. higher than the melting point of polyamide resin and a screw rotation speed of 200 rpm. A string was extruded, pelletized, and vacuum-dried at 80° C. for 24 hours. The pellets were injection-molded (SG75H-MIV, supplied by Sumitomo Heavy Industries, Ltd., set to a cylinder temperature of 20° C. higher than the melting point of polyamide resin, and a mold temperature of 80° C.) to provide various test pieces, and their mechanical properties were evaluated. Results are given in Table 8.

Polyamide resin samples as given in Table 6 were used as starting material along with an acid-modified ethylene/butene-1 copolymer impact strength modifier (Tafmer MH5020, supplied by Mitsui Chemicals, Inc.).

TABLE 7

| | | Example 19 | Comparative example 14 | Comparative example 15 | Comparative example 16 | Comparative example 17 |
|---|---|---|---|---|---|---|
| Polyamide resin | nylon 410 (melt polymerization) | 100 | | | | |
| | nylon 410 (solid phase polymerization) | | 100 | | | |
| | nylon 66 | | | 100 | | |
| | nylon 6 | | | | 100 | |
| | nylon 610 | | | | | 100 |
| Reinforcing material | glass fiber | 45 | 45 | 45 | 45 | 45 |
| Tensile characteristics | strength (MPa) | 186 | 177 | 179 | 184 | 150 |
| Bending characteristics | strength (MPa) | 250 | 244 | 245 | 241 | 202 |
| | elastic modulus (GPa) | 8.3 | 8.2 | 8.2 | 8.6 | 6.7 |
| LLC resistance | tensile strength retention (%) | 58 | 54 | 42 | 39 | 60 |

TABLE 8

|  |  | Example 20 | Comparative example 18 | Comparative example 19 | Comparative example 20 | Comparative example 21 |
|---|---|---|---|---|---|---|
| Polyamide resin | nylon 410 (melt polymerization) | 100 |  |  |  |  |
|  | nylon 410 (solid phase polymerization) |  | 100 |  |  |  |
|  | nylon 66 |  |  | 100 |  |  |
|  | nylon 6 |  |  |  | 100 |  |
|  | nylon 610 |  |  |  |  | 100 |
| Impact strength modifier | MH5020 | 25 | 25 | 25 | 25 | 25 |
| Tensile characteristics | strength (MPa) | 50 | 48 | 48 | 46 | 41 |
|  | elongation (%) | 200< | 75 | 129 | 185 | 200< |
| Bending characteristics | strength (MPa) | 63 | 59 | 62 | 66 | 53 |
|  | elastic modulus (GPa) | 1.69 | 1.70 | 1.73 | 1.84 | 1.43 |
| Impact characteristics | Izod impact strength (J/m) | 1190 | 820 | 1110 | 1070 | 1110 |
| DTUL | (° C.) at 1.82 MPa(high load) | 67 | 64 | 66 | 60 | 60 |
| Viscoelasticity | tanδ peak-top value attributed to polyamide resin (° C.) | 0.112 | 0.113 | 0.140 | 0.146 | 0.140 |
|  | glass transition temperature attributed to polyamide resin (° C.) | 67.8 | 66.8 | 68.6 | 58.4 | 56.2 |
|  | glass transition temperature attributed to impact strength modifier (° C.) | −56.8 | −57.0 | −57.7 | −57.7 | −58.2 |

Example 21 and Comparative Examples 22 to 24

Polyamide resin samples, a flame retarder, and an antioxidant were combined to prepare preblends according to the compositions given in Table 9. They were melt-kneaded after being fed to a twin screw extruder (PCM-30, supplied by Ikegai Tekko Co., Ltd.) set to a cylinder temperature of 20° C. higher than the melting point and a screw rotation speed of 200 rpm. A string was extruded, pelletized, and vacuum-dried at 80° C. for 24 hours. The pellets were injection-molded (SG75H-MIV, supplied by Sumitomo Heavy Industries, Ltd., set to a cylinder temperature of 20° C. higher than the melting point of polyamide resin, and a mold temperature of 80° C.) to provide various test pieces, and their mechanical properties were evaluated. Results are given in Table 9.

Polyamide resin samples as given in Table 6 were used as starting material along with a flame retarder and an antioxidant as described below.
Flame retarder: melamine cyanurate (MC-4000, supplied by Nissan Chemical Industries, Ltd.)
Antioxidant: N,N'-hexamethylene bis(3,5-di-t-butyl-4-hydroxy-hydrocinnamamide) (TTAD, supplied by Toray Fine Chemicals Co., Ltd.)

TABLE 9

|  |  | Example 21 | Comparative example 22 | Comparative example 23 | Comparative example 24 |
|---|---|---|---|---|---|
| Polyamide resin | nylon 410 (melt polymerization) | 100 |  |  |  |
|  | nylon 410 (solid phase polymerization) |  | 100 |  |  |
|  | nylon 66 |  |  | 100 |  |
|  | nylon 610 |  |  |  | 100 |
| Flame retarder | melamine cyanurate | 6 | 6 | 6 | 6 |
| Antioxidant | TTAD | 0.3 | 0.3 | 0.3 | 0.3 |
| Tensile characteristics | strength (MPa) | 83 | 77 | 81 | 67 |
|  | elongation (%) | 20 | 9 | 6 | 17 |
| Bending characteristics | strength (MPa) | 114 | 110 | 115 | 95 |
|  | elastic modulus (GPa) | 3.3 | 3.0 | 3.1 | 2.6 |
| DTUL | (° C.) at 1.82 MPa (high load) | 115 | 111 | 100 | 93 |
| Flame retardance | UL | V-0 | V-0 | V-0 | V-2 |

INDUSTRIAL APPLICABILITY

With excellent heat resistance and melt retention stability, the polyamide resin according to the invention can be used preferably as material for electric/electronic related parts, automobile/vehicle related parts, home electric appliance/office electric device parts, computer related parts, facsimile/copier related parts, machine related parts, fibers, films, and other various uses.

The invention claimed is:

1. Polyamide resin produced by thermal polycondensation of tetramethylene diamine and either a aliphatic dicarboxylic acid with a carbon number of 7 or more or a salt thereof, having a chemical structure comprising amide groups derived from the aforementioned compounds as repeating units, having a relative viscosity in 98% sulfuric acid solution with a 0.01 g/ml content at 25° C. of 2.2 to 5.0 and having a degree of dispersion (weight average molecular weight/number average molecular weight) of 2.7 or less as measured by gel permeation chromatography.

2. Polyamide resin as claimed in claim 1 wherein the pyrrolidine content is $8.0 \times 10^{-5}$ mol/g or less.

3. Polyamide resin as claimed in claim 1 wherein the ratio, B/A, between the relative viscosity of a 98% sulfuric acid solution of the polyamide resin at 25° C. and at 0.01 g/ml content after melt retention for 30 minutes at a temperature 20° C. higher than the melting point, B, and the relative viscosity of a 98% sulfuric acid solution of the polyamide resin at 25° C. and at 0.01 g/ml content before the melt retention, A, is 0.7 or more and 1.5 or less.

4. Polyamide resin as claimed in claim 1 wherein said dicarboxylic acid with a carbon number of 7 or more is azelaic acid, sebacic acid, undecanedioic acid, or dodecanedioic acid.

5. A polyamide resin composition as claimed in claim 1 further comprising an inorganic filler.

6. A polyamide resin composition as claimed in claim 1 further comprising an impact strength modifier.

7. A polyamide resin composition as claimed in claim 1 further comprising a flame retarder.

8. Polyamide resin as claimed in claim 2 wherein the ratio, B/A, between the relative viscosity of a 98% sulfuric acid solution of the polyamide resin at 25° C. and at 0.01 g/ml content after melt retention for 30 minutes at a temperature 20° C. higher than the melting point, B, and the relative viscosity of a 98% sulfuric acid solution of the polyamide resin at 25° C. and at 0.01 g/ml content before the melt retention, A, is 0.7 or more and 1.5 or less.

9. Polyamide resin as claimed in claim 1 wherein after thermal polycondensation is initiated, melt polymerization is continued at a temperature equal to or higher than the melting point until the relative viscosity in 98% sulfuric acid solution with a 0.01 g/ml content at 25° C. falls in the range of 2.2 or more and 5.0 or less.

10. A method for producing polyamide resin according to claim 1 comprising:
    thermal polycondensation of tetramethylene diamine and either an aliphatic dicarboxylic acid with a carbon number of 7 or more or a salt thereof; and
    continuing melt polymerization at a temperature equal to or higher than the melting point until the relative viscosity in 98% sulfuric acid solution with a 0.01 g/ml content at 25° C. falls in the range of 2.2 or more and 5.0 or less.

11. A method for producing polyamide resin as claimed in claim 10 wherein the water content in the starting material is reduced to 30 wt % or less at a temperature lower than 201° C.

12. A method for producing polyamide resin as claimed in either claim 10 or 11 wherein the condensed water is removed at or above 201° C.

13. A polyamide resin production method as claimed in claim 10 wherein the maximum reachable pressure is 1 kg/cm$^2$ or more and 25 kg/cm$^2$ or less.

* * * * *